United States Patent
Jung et al.

(10) Patent No.: US 10,231,157 B2
(45) Date of Patent: Mar. 12, 2019

(54) SELECTIVE PRIORITIZATION METHOD OF FREQUENCY EXECUTED BY TERMINAL IN WIRELESS COMMUNICATION SYSTEM, AND TERMINAL USING SAME METHOD

(71) Applicant: LG ELECTRONICS INC., Seoul (KR)

(72) Inventors: Sunghoon Jung, Seoul (KR); Jaewook Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/564,281

(22) PCT Filed: Apr. 8, 2016

(86) PCT No.: PCT/KR2016/003735
§ 371 (c)(1),
(2) Date: Oct. 4, 2017

(87) PCT Pub. No.: WO2016/163824
PCT Pub. Date: Oct. 13, 2016

(65) Prior Publication Data
US 2018/0139669 A1    May 17, 2018

Related U.S. Application Data

(60) Provisional application No. 62/144,356, filed on Apr. 8, 2015.

(51) Int. Cl.
*H04W 36/00* (2009.01)
*H04W 36/06* (2009.01)

(52) U.S. Cl.
CPC ........... *H04W 36/06* (2013.01); *H04W 36/00* (2013.01); *H04W 36/0061* (2013.01)

(58) Field of Classification Search
CPC .................... H04W 36/06; H04W 36/0061
(Continued)

(56) References Cited

U.S. PATENT DOCUMENTS 9,591,544 B2 * 3/2017 Jung ................. H04W 48/18
9,609,581 B2 * 3/2017 Baghel ............. H04W 48/16
(Continued)

FOREIGN PATENT DOCUMENTS

| KR | 1020090045039 | 5/2009 |
| WO | 2014073940 | 5/2014 |
| WO | 2015046944 | 4/2015 |

OTHER PUBLICATIONS

3GPP TS 36.304 V8.5.0, Mar. 2009.
(Continued)

*Primary Examiner* — Marceau Milord
(74) *Attorney, Agent, or Firm* — Dentons US LLP

(57) ABSTRACT

The present invention relates to a device-to device (D2D) operation method executed by a terminal in a wireless communication system, comprising the steps of: acquiring a public land mobile network (PLMN) list for a first service; acquiring a PLMN list for a second service; determining frequency priorities on the basis of the PLMN list for the first service and the PLMN list for the second service; and performing cell re-selection on the basis of the frequency priorities, wherein said determining of the frequency priorities comprises determining, as a top priority, a frequency for a PLMN which is commonly included in the PLMN list for the first service and the PLMN list for the second service.

8 Claims, 15 Drawing Sheets

(58) Field of Classification Search
USPC ........ 455/436, 437, 432.1, 435.1, 434, 67.11
See application file for complete search history.

(56) References Cited

U.S. PATENT DOCUMENTS

| | | | | |
|---|---|---|---|---|
| 9,693,178 | B2* | 6/2017 | Adrangi | H04W 4/70 |
| 9,763,179 | B2* | 9/2017 | Pragada | H04W 12/06 |
| 2006/0166694 | A1* | 7/2006 | Jeong | H04W 48/16 |
| | | | | 455/525 |
| 2006/0172741 | A1* | 8/2006 | Jeong | H04W 36/0061 |
| | | | | 455/446 |
| 2009/0088131 | A1* | 4/2009 | Gholmieh | H04W 48/02 |
| | | | | 455/410 |
| 2009/0270103 | A1* | 10/2009 | Pani | H04W 36/0083 |
| | | | | 455/436 |
| 2010/0091719 | A1* | 4/2010 | Deshpande | H04W 8/183 |
| | | | | 370/329 |
| 2010/0105380 | A1* | 4/2010 | Attar | H04W 48/16 |
| | | | | 455/434 |
| 2010/0261474 | A1* | 10/2010 | Gollapudi | H04W 48/18 |
| | | | | 455/435.3 |
| 2012/0157095 | A1* | 6/2012 | Fodor | H04W 4/08 |
| | | | | 455/434 |
| 2013/0077517 | A1* | 3/2013 | Cho | H04L 43/50 |
| | | | | 370/252 |
| 2013/0288668 | A1* | 10/2013 | Pragada | H04W 12/06 |
| | | | | 455/426.1 |
| 2014/0051428 | A1* | 2/2014 | Jung | H04W 24/08 |
| | | | | 455/422.1 |
| 2014/0056220 | A1* | 2/2014 | Poitau | H04W 76/14 |
| | | | | 370/328 |
| 2014/0269269 | A1* | 9/2014 | Kovvali | H04W 24/08 |
| | | | | 370/229 |
| 2015/0142986 | A1* | 5/2015 | Reznik | H04L 67/16 |
| | | | | 709/228 |
| 2015/0271720 | A1* | 9/2015 | Yamada | H04W 76/14 |
| | | | | 370/331 |
| 2015/0271841 | A1* | 9/2015 | Yamada | H04W 56/0045 |
| | | | | 370/329 |
| 2015/0319797 | A1* | 11/2015 | Yamada | H04W 76/14 |
| | | | | 370/329 |
| 2015/0327141 | A1* | 11/2015 | Jung | H04W 48/18 |
| | | | | 370/331 |
| 2015/0327240 | A1* | 11/2015 | Yamada | H04W 72/02 |
| | | | | 455/426.1 |
| 2016/0029426 | A1* | 1/2016 | Bangolae | H04W 76/18 |
| | | | | 370/329 |
| 2016/0044552 | A1* | 2/2016 | Heo | H04W 4/008 |
| | | | | 370/331 |
| 2016/0157172 | A1* | 6/2016 | Jeong | H04W 76/14 |
| | | | | 370/329 |
| 2016/0227396 | A1* | 8/2016 | Lee | H04W 76/30 |
| 2016/0249341 | A1* | 8/2016 | Jung | H04W 76/14 |
| 2016/0278147 | A1* | 9/2016 | Adrangi | H04W 4/70 |
| 2017/0013640 | A1* | 1/2017 | Loehr | H04W 76/14 |
| 2017/0064534 | A1* | 3/2017 | Loehr | H04W 72/04 |
| 2017/0230928 | A1* | 8/2017 | Basu Mallick | H04W 56/0045 |
| 2017/0311115 | A1* | 10/2017 | Adrangi | H04W 4/70 |
| 2017/0374611 | A1* | 12/2017 | Pragada | H04L 69/24 |

OTHER PUBLICATIONS

3GPP; TSG RAN; Evolved Universal Terrestrial Radio Access (E-UTRA); User Equipment (UE) Procedures in Idle Module (Release 12), 3GPP TS 36.304 V12.4.0, Mar. 23, 2015, see section 5.2.4.1.
3GPP; TSG SA; Proximity-based SErvices (ProSe); Stage 2 (Release 12), 3GPP TS 23.303 V12.4.0, Mar. 19, 2015, see section 4.5.1.1.2.3.1.

* cited by examiner

SELECTIVE PRIORITIZATION METHOD OF FREQUENCY EXECUTED BY TERMINAL IN WIRELESS COMMUNICATION SYSTEM, AND TERMINAL USING SAME METHOD

CROSS-REFERENCE TO RELATED APPLICATIONS

This application is the National Stage filing under 35 U.S.C. 371 of International Application No. PCT/KR2016/003735, filed on Apr. 8, 2016, which claims the benefit of U.S. Provisional Application No. 62/144,356 filed on Apr. 8, 2015, the contents of which are all hereby incorporated by reference herein in their entirety.

BACKGROUND OF THE INVENTION

Field of the Invention

The present invention relates to wireless communication and, more particularly, to a device-to-device (D2D) operation method executed by a terminal in a wireless communication system, and to the terminal using the method.

Related Art

In the International Telecommunication Union Radio Communication Sector (ITU-R), standardization of International Mobile Telecommunication (IMT)-Advanced, which is a next generation mobile communication system after the third generation mobile communication system is underway.

IMT-Advanced aims to support IP (Internet Protocol)-based multimedia service at data transmission rates of 1 Gbps in a stationary and low-speed moving state and 100 M bps in a fast moving state.

The 3rd Generation Partnership Project (3GPP) is preparing, as a system standard that meets the requirements of IMT-Advanced, LTE-Advanced (LTE-A), that is, an improved version of LTE (Long Term Evolution) based on OFDMA (Orthogonal Frequency Division Multiple Access)/SC-FDMA (Single Carrier-Frequency Division Multiple Access). LTE-A is one of the strong candidates for IMT-Advanced.

Recently, interest in D2D (Device-to-Device) technology, which is a direct communication technology between devices, is increasing. In particular, D2D is attracting attention as a communication technology for public safety networks. Commercial communications networks are rapidly changing to LTE. However, in terms of conflicts with existing communication standards and cost, current public safety networks are mainly based on 2G technology. These technological gaps and demands for improved services have led to of forts to improve public safety networks.

Public safety networks have higher service requirements (reliability and security) than commercial communication networks. In particular, public safety networks are demanding direct signal transmission and reception between devices, that is, D2D operation, even when the coverage of cellular communication is insufficient or cellular communication is not available.

D2D operation may have various advantages in terms of signal transmission/reception between adjacent devices. For example, the D2D terminal may perform data communication at a high data rate and a low delay. Further, due to the D2D operation, the traffic concentrated on the base station may be distributed. When the D2D terminal functions as a repeater, the corresponding terminal may also serve to expand the coverage of the base station.

The wireless device may perform frequency reselection to receive the D2D service. When performing frequency reselection, the wireless device may take into account the priorities for the frequencies used for the D2D service. Based on the frequency priority, the wireless device may select the frequency to be used to receive the D2D service.

In this connection, a wireless device may intend to receive both cellular services as well as D2D services in a certain cell at a particular frequency. However, despite the fact that the wire less device wants to receive both the D2D service and the cellular service, the wireless device selects a frequency used to provide only the D2D service based on the frequency priority and transmits and receives a radio signal via the cell corresponding to the selected frequency. In this case, the wireless device may only receive the D2D service via the cell, but may not receive the cellular service. Accordingly, a method and device for solving the above-mentioned problem are required.

SUMMARY OF THE INVENTION

The present invention provides a D2D operation method performed by a wireless device in a wireless communication system and a wireless device using the D2D operation method.

In an aspect, a method for device-to-device (D2D) operation performed by a wire less device in a wireless communication system is provided. The method comprises acquiring a Public Land Mobile Network (PLMN) list for a first service, acquiring a PLMN list for a second service, determining a frequency priority based on the PLMN list for the first service and the PLMN list for the second service and performing cell reselection based on the determined frequency priority, wherein determining the frequency priority includes determining, as a highest priority frequency, a frequency corresponding to a PLMN commonly included in the PLMN list for the first service and the PLMN list for the second service.

The first service may be a D2D service, and the second service is a cellular service.

Each of a PLMN list for the D2D service and a PLMN list for the cellular service may be an Equivalent PLMN (EPLMN) list, wherein the EPLMN list is a list of PLMNs for which location registration has been successfully completed.

The PLMN list for the D2D service may include a first PLMN and a second PLMN, wherein the PLMN list for the cellular service includes the second PLMN and a third PLMN.

A frequency corresponding to the second PLMN may be determined as the highest priority frequency.

A cell on the frequency corresponding to the second PLMN may be a suitable cell or an acceptable cell, the suitable cell is a cell capable of receiving a normal service, and the acceptable cell is a cell capable of acquiring an emergency communication service.

The method may further comprise receiving the first service or the second service via a cell on the highest priority frequency.

The first service is a Vehicle-to-Infra/Vehicle/Nomadic (V2X) service, and the sec and service is a cellular service.

In another aspect, a wireless device is provided. The wireless device comprises a radio frequency (RF) unit for transmitting and receiving a radio signal and a processor operably coupled to the RF unit, wherein the processor is configured to acquire a Public Land Mobile Network (PLMN) list for a first service, acquire a PLMN list for a second service, determine a frequency priority based on the PLMN list for the first service and the PLMN list for the second service and perform cell reselection based on the determined frequency priority, wherein the processor is further configured to determine, as a highest priority frequency, a frequency corresponding to a PLMN commonly included in the PLMN list for the first service and the PLMN list for the second service.

The first service may be a D2D service, and the second service is a cellular service.

Each of a PLMN list for the D2D service and a PLMN list for the cellular service may be an Equivalent PLMN (EPLMN) list, wherein the EPLMN list is a list of PLMNs for which location registration has been successfully completed.

The PLMN list for the D2D service may include a first PLMN and a second PLMN, wherein the PLMN list for the cellular service includes the second PLMN and a third PLMN.

A frequency corresponding to the second PLMN may be determined as the highest priority frequency.

A cell on the frequency corresponding to the second PLMN may be a suitable cell or an acceptable cell, the suitable cell is a cell capable of receiving a normal service, and the acceptable cell is a cell capable of acquiring an emergency communication service.

The method may further comprise receiving the first service or the second service via a cell on the highest priority frequency.

The first service is a Vehicle-to-Infra/Vehicle/Nomadic (V2X) service, and the second service is a cellular service.

According to the present invention, a D2D operation method performed by a wireless device in a wireless communication system and a wireless device using the D2D operation method are provided.

According to the present invention, when a wireless device performs a D2D operation and determines a priority level of a frequency, not only a D2D service but also a cellular service are considered. Accordingly, when the wireless device transmits/receives a radio signal based on the determined frequency-based cell, the wireless device may receive not only the D2D service but also the cellular service in the cell. That is, in order for the wireless device to receive the D2D service and receive the cellular service, the current wireless device needs not to move from the cell on which the device camps (i.e., the D2D service may be provided via the cell) to a cell capable of providing the cellular service to the device. Accordingly, in the present invention, since the wireless device does not need to move between cells unnecessarily, the wireless communication efficiency is maximized.

DESCRIPTION OF EXEMPLARY EMBODIMENTS

Figure 1:
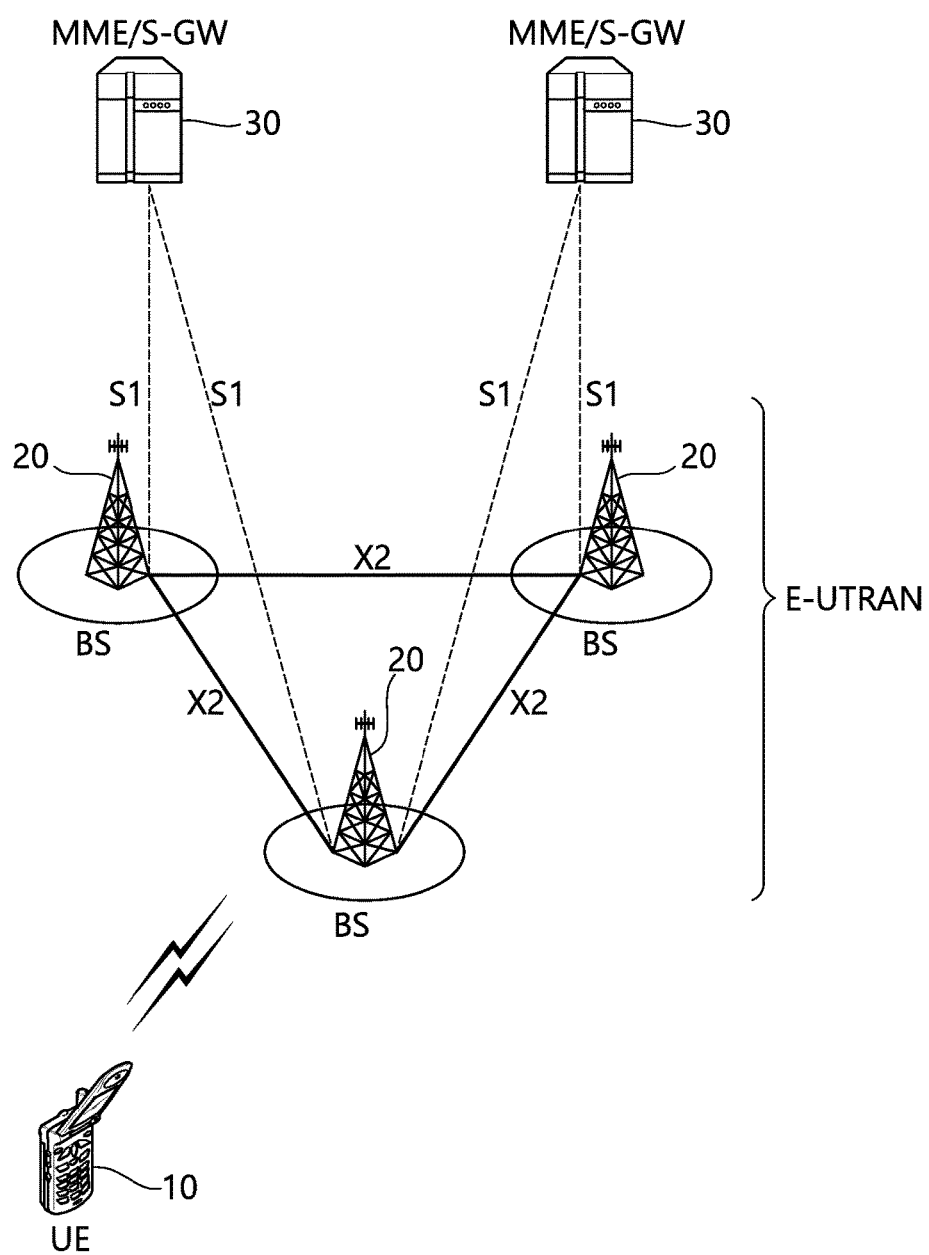
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
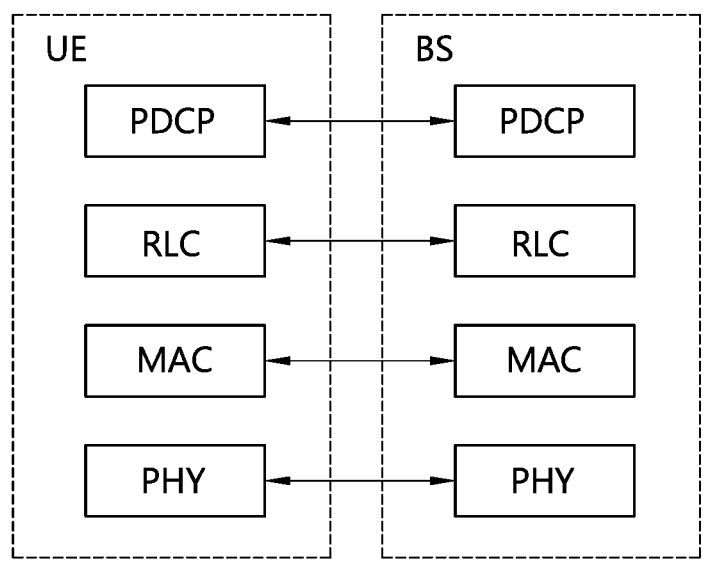
FIG. 2 is a diagram showing a wireless protocol architecture for a user plane.
Figure 3:
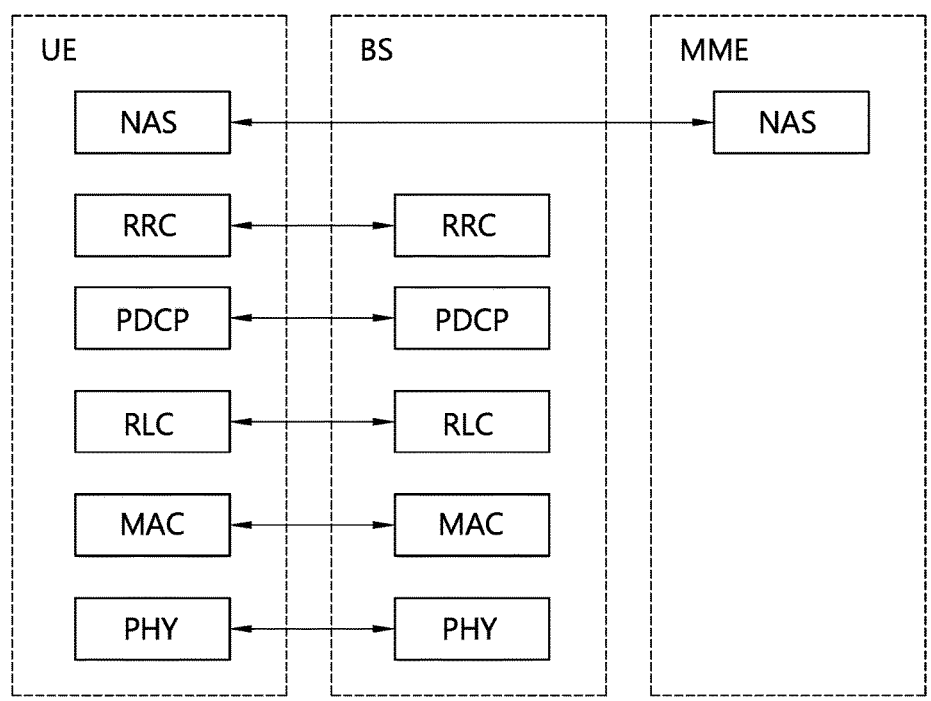
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a procedure of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel A Transmission Time Interval (TTI) is a unit time for subframe transmission.

The RRC state of UE and an RRC connection method are described below.

The RRC state means whether or not the RRC layer of UE is logically connected to the RRC layer of the E-UTRAN. A case where the RRC layer of UE is logically connected to the RRC layer of the E-UTRAN is referred to as an RRC connected state. A case where the RRC layer of UE is not logically connected to the RRC layer of the E-UTRAN is referred to as an RRC idle state. The E-UTRAN may check the existence of corresponding UE in the RRC connected state in each cell because the UE has RRC connection, so the UE may be effectively controlled. In contrast, the E-UTRAN is unable to check UE in the RRC idle state, and a Core Network (CN) manages UE in the RRC idle state in each tracking area, that is, the unit of an area greater than a cell. That is, the existence or non-existence of UE in the RRC idle state is checked only for each large area. Accordingly, the UE needs to shift to the RRC connected state in order to be provided with common mobile communication service, such as voice or data.

When a user first powers UE, the UE first searches for a proper cell and remains in the RRC idle state in the corresponding cell. The UE in the RRC idle state establishes RRC connection with an E-UTRAN through an RRC connection procedure when it is necessary to set up the RRC connection, and shifts to the RRC connected state. A case where UE in the RRC idle state needs to set up RRC connection includes several cases. For example, the cases may include a need to send uplink data for a reason, such as a call attempt by a user, and to send a response message as a response to a paging message received from an E-UTRAN.

A Non-Access Stratum (NAS) layer placed over the RRC layer performs functions, such as session management and mobility management.

In the NAS layer, in order to manage the mobility of UE, two types of states: EPS Mobility Management-REGISTERED (EMM-REGISTERED) and EMM-DEREGISTERED are defined. The two states are applied to UE and the MME. UE is initially in the EMM-DEREGISTERED state. In order to access a network, the UE performs a procedure of registering it with the corresponding network through an initial attach procedure. If the attach procedure is successfully performed, the UE and the MME become the EMM-REGISTERED state.

In order to manage signaling connection between UE and the EPC, two types of states: an EPS Connection Management (ECM)-IDLE state and an ECM-CONNECTED state are defined. The two states are applied to UE and the MME. When the UE in the ECM-IDLE state establishes RRC connection with the E-UTRAN, the UE becomes the ECM-CONNECTED state. The MME in the ECM-IDLE state becomes the ECM-CONNECTED state when it establishes S1 connection with the E-UTRAN. When the UE is in the ECM-IDLE state, the E-UTRAN does not have information about the context of the UE. Accordingly, the UE in the ECM-IDLE state performs procedures related to UE-based mobility, such as cell selection or cell reselection, without a need to receive a command from a network. In contrast, when the UE is in the ECM-CONNECTED state, the mobility of the UE is managed in response to a command from a network. If the location of the UE in the ECM-IDLE state is different from a location known to the network, the UE informs the network of its corresponding location through a tracking area update procedure.

System information is described below.

System information includes essential information that needs to be known by UE in order for the UE to access a BS. Accordingly, the UE needs to have received all pieces of system information before accessing the BS, and needs to always have the up-to-date system information. Furthermore, the BS periodically transmits the system information because the system information is information that needs to be known by all UEs within one cell. The system information is divided into a Master Information Block (MIB) and a plurality of System Information Blocks (SIBs).

The MIB may include a limited number of parameters that are most essential and most frequently transmitted when other information is required to be obtained from a cell. UE first searches for an MIB after downlink synchronization. The MIB may include information, such as an SFN that supports downlink channel bandwidth, a PHICH configuration, and synchronization and operates as a timing criterion and an eNB transmit antenna configuration. The MIB may be transmitted on a broadcast channel (BCH) through broadcasting.

SystemInformationBlockType1 (SIB1) of included SIBs is included in a "SystemInformationBlockType1" message and transmitted. The remaining SIBs other than the SIB1 is included in a system information message and transmitted. To map the SIBs to the system information message may be flexibly configured by a scheduling information list parameter included in the SIB1. In this case, each of the SIBs is included in a single system information message, and only SIBs having the same scheduling requirement value (e.g. cycle) may be mapped to the same system information message. Furthermore, a SystemInformationBlockType2 (SIB2) is always mapped to a system information message corresponding to the first entry within the system information message list of a scheduling information list. A plurality of system information messages may be transmitted within the same cycle. The SIB1 and all the system information messages are transmitted on a DL-SCH.

In addition to broadcast transmission, in an E-UTRAN, the SIB1 may be dedicated-signaled in the state in which it includes a parameter configured like an existing configured value. In this case, the SIB1 may be included in an RRC connection reconfiguration message and transmitted.

The SIB1 includes information related to UE cell access, and defines the scheduling of other SIBs. The SIB1 may include information related to the PLMN identifiers of a network, tracking area code (TAC) and a cell ID, a cell barring status indicative of whether a cell is a cell on which camp-on is possible, the lowest reception level required within a cell which is used as cell reselection criterion, and the transmission time and cycle of other SIBs.

The SIB2 may include radio resource configuration information common to all pieces of UE. The SIB2 may include information related to an uplink carrier frequency and uplink channel bandwidth, an RACH configuration, a page configuration, an uplink power control configuration, a sounding reference signal configuration, a PUCCH configuration supporting ACK/NACK transmission, and a PUSCH configuration.

UE may apply a procedure for obtaining system information and detecting a change of system information to a primary cell (PCell) only. In a secondary cell (SCell), when a corresponding SCell is added, an E-UTRAN may provide all of pieces of system information related to an RRC connection state operation through dedicated signaling. When system information related to a configured SCell is changed, an E-UTRAN may release an SCell that is taken into consideration and subsequently add the changed system information. This may be performed along with a single RRC connection reconfiguration message. An E-UTRAN may configure parameter values different from a value broadcasted within an SCell that has been taken into consideration through dedicated signaling.

UE needs to guarantee the validity of a specific type of system information, and such system information is called required system information. The required system information may be defined as follows.

If UE is an RRC idle state: The UE needs to be guaranteed so that it has the valid versions of the MIB and the SIB1 in addition to the SIB2 to SIB8. This may comply with the support of a radio access technology (RAT) that is taken into consideration.

If UE is an RRC connection state: The UE needs to be guaranteed so that it has the valid versions of the MIB, the SIB1, and the SIB2.

In general, the validity of system information may be guaranteed up to a maximum of 3 hours after the system information is obtained.

In general, service that is provided to UE by a network may be classified into three types as follows. Furthermore, the UE differently recognizes the type of cell depending on what service may be provided to the UE. In the following description, a service type is first described, and the type of cell is described.

1) Limited service: this service provides emergency calls and an Earthquake and Tsunami Warning System (ETWS), and may be provided by an acceptable cell.

2) Suitable service: this service means public service for common uses, and may be provided by a suitable cell (or a normal cell).

3) Operator service: this service means service for communication network operators. This cell may be used by only communication network operators, but may not be used by common users.

In relation to a service type provided by a cell, the type of cell may be classified as follows.

1) An acceptable cell: this cell is a cell from which UE may be provided with limited service. This cell is a cell that has not been barred from a viewpoint of corresponding UE and that satisfies the cell selection criterion of the UE.

2) A suitable cell: this cell is a cell from which UE may be provided with suitable service. This cell satisfies the conditions of an acceptable cell and also satisfies additional conditions. The additional conditions include that the suitable cell needs to belong to a Public Land Mobile Network (PLMN) to which corresponding UE may access and that the suitable cell is a cell on which the execution of a tracking area update procedure by the UE is not barred. If a corresponding cell is a CSG cell, the cell needs to be a cell to which UE may access as a member of the CSG.

3) A barred cell: this cell is a cell that broadcasts information indicative of a barred cell through system information.

4) A reserved cell: this cell is a cell that broadcasts information indicative of a reserved cell through system information.

Figure 4:
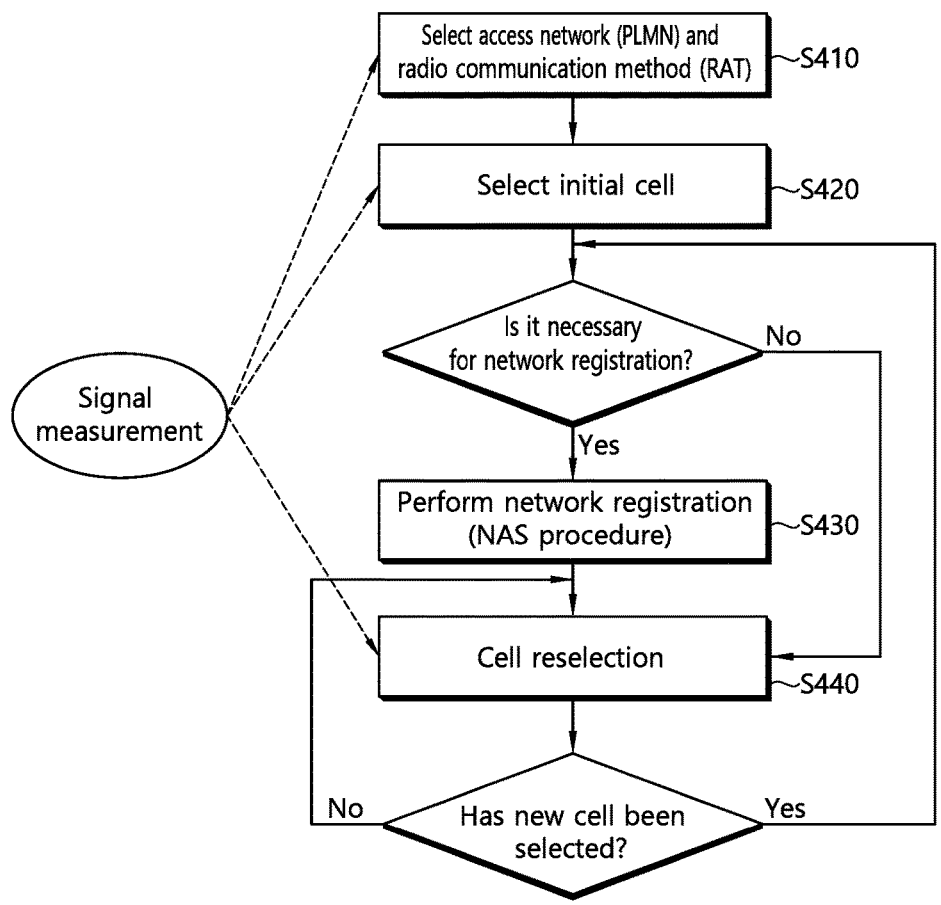
FIG. 4 is a flowchart illustrating the operation of UE in the RRC idle state.

FIG. 4 is a flowchart illustrating the operation of UE in the RRC idle state. FIG. 4 illustrates a procedure in which UE that is initially powered on experiences a cell selection procedure, registers it with a network, and then performs cell reselection if necessary.

Referring to FIG. 4, the UE selects Radio Access Technology (RAT) in which the UE communicates with a Public Land Mobile Network (PLMN), that is, a network from which the UE is provided with service (S410). Information about the PLMN and the RAT may be selected by the user of the UE, and the information stored in a Universal Subscriber Identity Module (USIM) may be used.

The UE selects a cell that has the greatest value and that belongs to cells having measured BS and signal intensity or quality greater than a specific value (cell selection) (S420). In this case, the UE that is powered off performs cell selection, which may be called initial cell selection. A cell selection procedure is described later in detail. After the cell selection, the UE receives system information periodically by the BS. The specific value refers to a value that is defined in a system in order for the quality of a physical signal in data transmission/reception to be guaranteed. Accordingly, the specific value may differ depending on applied RAT.

If network registration is necessary, the UE performs a network registration procedure (S430). The UE registers its information (e.g., an IMSI) with the network in order to receive service (e.g., paging) from the network. The UE does not register it with a network whenever it selects a cell, but registers it with a network when information about the network (e.g., a Tracking Area Identity (TAI)) included in system information is different from information about the network that is known to the UE.

The UE performs cell reselection based on a service environment provided by the cell or the environment of the UE (S440). If the value of the intensity or quality of a signal measured based on a BS from which the UE is provided with service is lower than that measured based on a BS of a neighboring cell, the UE selects a cell that belongs to other cells and that provides better signal characteristics than the cell of the BS that is accessed by the UE. This procedure is called cell reselection differently from the initial cell selection of the No. 2 procedure. In this case, temporal restriction conditions are placed in order for a cell to be frequently reselected in response to a change of signal characteristic. A cell reselection procedure is described later in detail.

Figure 5:
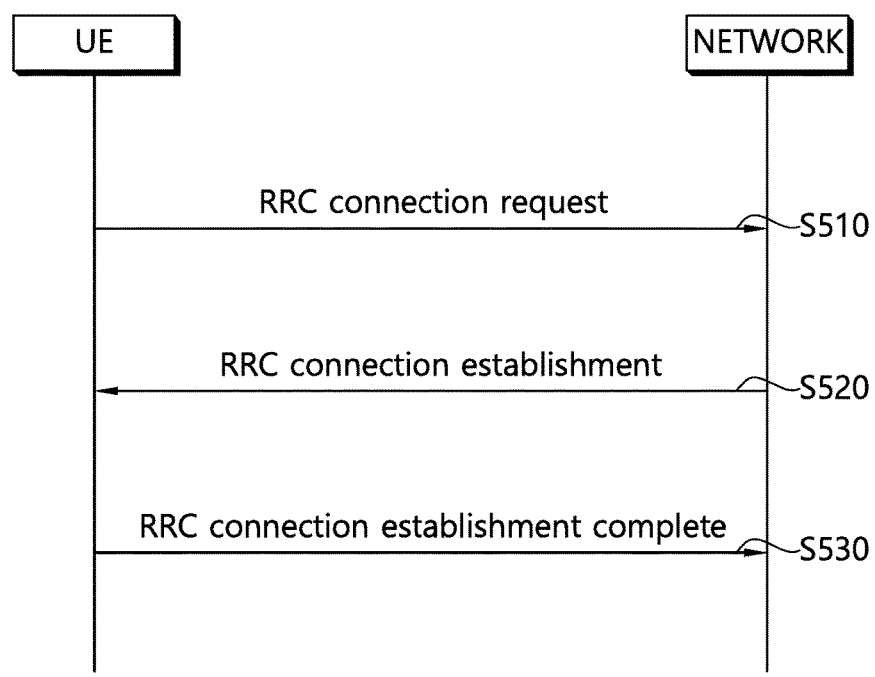
FIG. 5 is a flowchart illustrating a procedure of establishing RRC connection.

FIG. 5 is a flowchart illustrating a procedure of establishing RRC connection.

UE sends an RRC connection request message that requests RRC connection to a network (S510). The network sends an RRC connection establishment message as a response to the RRC connection request (S520). After receiving the RRC connection establishment message, the UE enters RRC connected mode.

The UE sends an RRC connection establishment complete message used to check the successful completion of the RRC connection to the network (S530).

Figure 6:
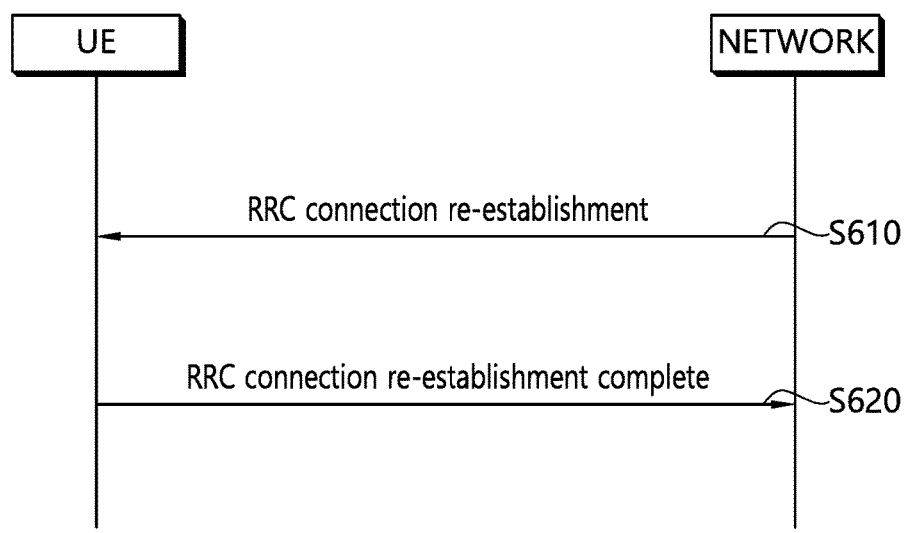
FIG. 6 is a flowchart illustrating an RRC connection reconfiguration procedure.

FIG. 6 is a flowchart illustrating an RRC connection reconfiguration procedure. An RRC connection reconfiguration is used to modify RRC connection. This is used to establish/modify/release RBs, perform handover, and set up/modify/release measurements.

A network sends an RRC connection reconfiguration message for modifying RRC connection to UE (S610). As a response to the RRC connection reconfiguration message, the UE sends an RRC connection reconfiguration complete message used to check the successful completion of the RRC connection reconfiguration to the network (S620).

Hereinafter, a public land mobile network (PLMN) is described.

The PLMN is a network which is disposed and operated by a mobile network operator. Each mobile network operator operates one or more PLMNs. Each PLMN may be identified by a Mobile Country Code (MCC) and a Mobile Network Code (MNC). PLMN information of a cell is included in system information and broadcasted.

In PLMN selection, cell selection, and cell reselection, various types of PLMNs may be considered by the terminal.

Home PLMN (HPLMN): PLMN having MCC and MNC matching with MCC and MNC of a terminal IMSI.

Equivalent HPLMN (EHPLMN): PLMN serving as an equivalent of an HPLMN.

Registered PLMN (RPLMN): PLMN successfully finishing location registration.

Equivalent PLMN (EPLMN): PLMN serving as an equivalent of an RPLMN.

Each mobile service consumer subscribes in the HPLMN. When a general service is provided to the terminal through the HPLMN or the EHPLMN, the terminal is not in a roaming state. Meanwhile, when the service is provided to the terminal through a PLMN except for the HPLMN/EHPLMN, the terminal is in the roaming state. In this case, the PLMN refers to a Visited PLMN (VPLMN).

When UE is initially powered on, the UE searches for available Public Land Mobile Networks (PLMNs) and selects a proper PLMN from which the UE is able to be provided with service. The PLMN is a network that is deployed or operated by a mobile network operator. Each mobile network operator operates one or more PLMNs. Each PLMN may be identified by Mobile Country Code (MCC) and Mobile Network Code (MNC). Information about the PLMN of a cell is included in system information and broadcasted. The UE attempts to register it with the selected PLMN. If registration is successful, the selected PLMN becomes a Registered PLMN (RPLMN). The network may signalize a PLMN list to the UE. In this case, PLMNs included in the PLMN list may be considered to be PLMNs, such as RPLMNs. The UE registered with the network needs to be able to be always reachable by the network. If the UE is in the ECM-CONNECTED state (identically the RRC connection state), the network recognizes that the UE is being provided with service. If the UE is in the ECM-IDLE state (identically the RRC idle state), however, the situation of the UE is not valid in an eNB, but is stored in the MME. In such a case, only the MME is informed of the location of the UE in the ECM-IDLE state through the granularity of the list of Tracking Areas (TAs). A single TA is identified by a Tracking Area Identity (TAI) formed of the identifier of a PLMN to which the TA belongs and Tracking Area Code (TAC) that uniquely expresses the TA within the PLMN.

Thereafter, the UE selects a cell that belongs to cells provided by the selected PLMN and that has signal quality and characteristics on which the UE is able to be provided with proper service.

The following is a detailed description of a procedure of selecting a cell by a terminal.

When power is turned-on or the terminal is located in a cell, the terminal performs procedures for receiving a service by selecting/reselecting a suitable quality cell.

A terminal in an RRC idle state should prepare to receive a service through the cell by always selecting a suitable quality cell. For example, a terminal where power is turned-on just before should select the suitable quality cell to be registered in a network. If the terminal in an RRC connection state enters in an RRC idle state, the terminal should selects a cell for stay in the RRC idle state. In this way, a procedure of selecting a cell satisfying a certain condition by the terminal in order to be in a service idle state such as the RRC idle state refers to cell selection. Since the cell selection is performed in a state that a cell in the RRC idle state is not currently determined, it is important to select the cell as rapid as possible. Accordingly, if the cell provides a wireless signal quality of a predetermined level or greater, although the cell does not provide the best wireless signal quality, the cell may be selected during a cell selection procedure of the terminal.

A method and a procedure of selecting a cell by a terminal in a 3GPP LTE is described with reference to 3GPP TS 36.304 V8.5.0 (2009 March) "User Equipment (UE) procedures in idle mode (Release 8)".

A cell selection procedure is basically divided into two types.

The first is an initial cell selection procedure. In this procedure, UE does not have preliminary information about a wireless channel. Accordingly, the UE searches for all wireless channels in order to find out a proper cell. The UE searches for the strongest cell in each channel. Thereafter, if the UE has only to search for a suitable cell that satisfies a cell selection criterion, the UE selects the corresponding cell.

Next, the UE may select the cell using stored information or using information broadcasted by the cell. Accordingly, cell selection may be fast compared to an initial cell selection procedure. If the UE has only to search for a cell that satisfies the cell selection criterion, the UE selects the corresponding cell. If a suitable cell that satisfies the cell selection criterion is not retrieved though such a procedure, the UE performs an initial cell selection procedure.

A cell selection criterion may be defined as in Equation 1 below. Following Equation 1 can be referred to as measurement for determining whether or not S-criterion is satisfied.

$$Srxlev > 0 \text{ AND } Squal > 0, \qquad [\text{Equation 1}]$$

where:

$$Srxlev = Q_{rxlevmeas} - (Q_{rxlevmin} + Q_{rxlevminoffset}) - P_{compensation},$$

$$Squal = Q_{qualmeas} - (Q_{qualmin} + Q_{qualminoffset})$$

In this case, in Equation 1, the variables may be defined as in Table 1 below.

TABLE 1

| | |
|---|---|
| Srxlev | Cell selection RX level value (dB) |
| Squal | Cell selection quality value (dB) |

TABLE 1-continued

| | |
|---|---|
| $Q_{rxlevmeas}$ | Measured cell RX level value (RSRP) |
| $Q_{qualmeas}$ | Measured cell quality value (RSRQ) |
| $Q_{rxlevmin}$ | Minimum required RX level in the cell (dBm) |
| $Q_{qualmin}$ | Minimum required quality level in the cell (dB) |
| $Q_{rxlevminoffset}$ | Offset to the signalled $Q_{rxlevmin}$ taken into account in the Srxlev evaluation as a result of a periodic search for a higher priority PLMN while camped normally in a VPLMN |
| $Q_{qualminoffset}$ | Offset to the signalled $Q_{qualmin}$ taken into account in the Squal evaluation as a result of a periodic search for a higher priority PLMN while camped normally in a VPLMN |
| Pcompensation | max($P_{EMAX} - P_{PowerClass}$, 0) (dB) |
| $P_{EMAX}$ | Maximum TX power level an UE may use when transmitting on the uplink in the cell (dBm) defined as $P_{EMAX}$ in [TS 36.101] |
| $P_{PowerClass}$ | Maximum RF output power of the UE (dBm) according to the UE power class as defined in [TS 36.101] |

Qrxlevminoffset and Qqualminoffset, that is, signaled values, are the results of periodic discovery for a PLMN having higher priority while UE camps on a normal cell within a VPLMN, and may be applied only when cell selection is evaluated. As described above, during the periodic discovery of a PLMN having higher priority, UE may perform cell selection evaluation using parameter values stored from another cell of the PLMN having such higher priority.

After UE selects any cell through a cell selection procedure, the intensity or quality of a signal between the UE and a BS may be changed due to the mobility of the UE or a change of a radio environment. Accordingly, if the quality of the selected cell is changed, the UE may select another cell providing better quality.

After the UE selects a specific cell through the cell selection procedure, the intensity or quality of a signal between the UE and a BS may be changed due to a change in the mobility or wireless environment of the UE. Accordingly, if the quality of the selected cell is deteriorated, the UE may select another cell that provides better quality. If a cell is reselected as described above, the UE selects a cell that provides better signal quality than the currently selected cell. Such a procedure is called cell reselection. In general, a basic object of the cell reselection procedure is to select a cell that provides UE with the best quality from a viewpoint of the quality of a radio signal.

In addition to the viewpoint of the quality of a radio signal, a network may determine priority corresponding to each frequency, and may inform the UE of the determined priorities. The UE that has received the priorities preferentially takes into consideration the priorities in a cell reselection procedure compared to a radio signal quality criterion.

As described above, there is a method of selecting or reselecting a cell according to the signal characteristics of a wireless environment. In selecting a cell for reselection when a cell is reselected, the following cell reselection methods may be present according to the RAT and frequency characteristics of the cell.

Intra-frequency cell reselection: UE reselects a cell having the same center frequency as that of RAT, such as a cell on which the UE camps on.

Inter-frequency cell reselection: UE reselects a cell having a different center frequency from that of RAT, such as a cell on which the UE camps on Inter-RAT cell reselection: UE reselects a cell that uses RAT different from RAT on which the UE camps The principle of a cell reselection procedure is as follows.

First, UE measures the quality of a serving cell and neighbor cells for cell reselection.

Second, cell reselection is performed based on a cell reselection criterion. The cell reselection criterion has the following characteristics in relation to the measurements of a serving cell and neighbor cells.

Intra-frequency cell reselection is basically based on ranking. Ranking is a task for defining a criterion value for evaluating cell reselection and numbering cells using criterion values according to the size of the criterion values. A cell having the best criterion is commonly called the best-ranked cell. The cell criterion value is based on the value of a corresponding cell measured by UE, and may be a value to which a frequency offset or cell offset has been applied, if necessary.

Inter-frequency cell reselection is based on frequency priority provided by a network. UE attempts to camp on a frequency having the highest frequency priority. A network may provide frequency priority that will be applied by UEs within a cell in common through broadcasting signaling, or may provide frequency-specific priority to each UE through UE-dedicated signaling. A cell reselection priority provided through broadcast signaling may refer to a common priority. A cell reselection priority for each terminal set by a network may refer to a dedicated priority. If receiving the dedicated priority, the terminal may receive a valid time associated with the dedicated priority together. If receiving the dedicated priority, the terminal starts a validity timer set as the received valid time together therewith. While the valid timer is operated, the terminal applies the dedicated priority in the RRC idle mode. If the valid timer is expired, the terminal discards the dedicated priority and again applies the common priority.

For the inter-frequency cell reselection, a network may provide UE with a parameter (e.g., a frequency-specific offset) used in cell reselection for each frequency. For the intra-frequency cell reselection or the inter-frequency cell reselection, a network may provide UE with a Neighboring Cell List (NCL) used in cell reselection. The NCL includes a cell-specific parameter (e.g., a cell-specific offset) used in cell reselection. For the intra-frequency or inter-frequency cell reselection, a network may provide UE with a cell reselection black list used in cell reselection.

The UE does not perform cell reselection on a cell included in the black list.

Ranking performed in a cell reselection evaluation procedure is described below.

A ranking criterion used to give the priority of a cell is defined as in Equation 2.

$$R_s=Q_{meas,s}+Q_{hyst}, R_n=Q_{meas,n}-Q_{offset}$$ [Equation 2]

In Equation 2, Rs is the ranking criterion of a serving cell on which UE now camps, Rn is the ranking criterion of a neighboring cell, Qmeas,s is the quality value of the serving cell measured by the UE, Qmeas,n is the quality value of the neighboring cell measured by the UE, Qhyst is a hysteresis value for ranking, and Qoffset is an offset between the two cells.

In Intra-frequency, if UE receives an offset "Qoffsets,n" between a serving cell and a neighbor cell, Qoffset=Qoffsets,n. If UE does not Qoffsets,n, Qoffset=0.

In Inter-frequency, if UE receives an offset "Qoffsets,n" for a corresponding cell, Qoffset=Qoffsets,n+Qfrequency. If UE does not receive "Qoffsets,n", Qoffset=Qfrequency.

If the ranking criterion Rs of a serving cell and the ranking criterion Rn of a neighbor cell are changed in a similar state, ranking priority is frequency changed as a result of the change, and UE may alternately reselect the twos. Qhyst is a parameter that gives hysteresis to cell reselection so that UE is prevented from to alternately reselecting two cells.

UE measures RS of a serving cell and Rn of a neighbor cell according to the above equation, considers a cell having the greatest ranking criterion value to be the best-ranked cell, and reselects the cell.

In accordance with the criterion, it may be checked that the quality of a cell is the most important criterion in cell reselection. If a reselected cell is not a suitable cell, UE excludes a corresponding frequency or a corresponding cell from the subject of cell reselection.

Hereinafter, radio link failure (RLF) will be described.

UE continues to perform measurements in order to maintain the quality of a radio link with a serving cell from which the UE receives service. The UE determines whether or not communication is impossible in a current situation due to the deterioration of the quality of the radio link with the serving cell. If communication is almost impossible because the quality of the serving cell is too low, the UE determines the current situation to be an RLF.

If the RLF is determined, the UE abandons maintaining communication with the current serving cell, selects a new cell through cell selection (or cell reselection) procedure, and attempts RRC connection re-establishment with the new cell.

In the specification of 3GPP LTE, the following examples are taken as cases where normal communication is impossible.

A case where UE determines that there is a serious problem in the quality of a downlink communication link (a case where the quality of a PCell is determined to be low while performing RLM) based on the radio quality measured results of the PHY layer of the UE A case where uplink transmission is problematic because a random access procedure continues to fail in the MAC sublayer.

A case where uplink transmission is problematic because uplink data transmission continues to fail in the RLC sublayer.

A case where handover is determined to have failed.

A case where a message received by UE does not pass through an integrity check.

An RRC connection re-establishment procedure is described in more detail below.

Figure 7:
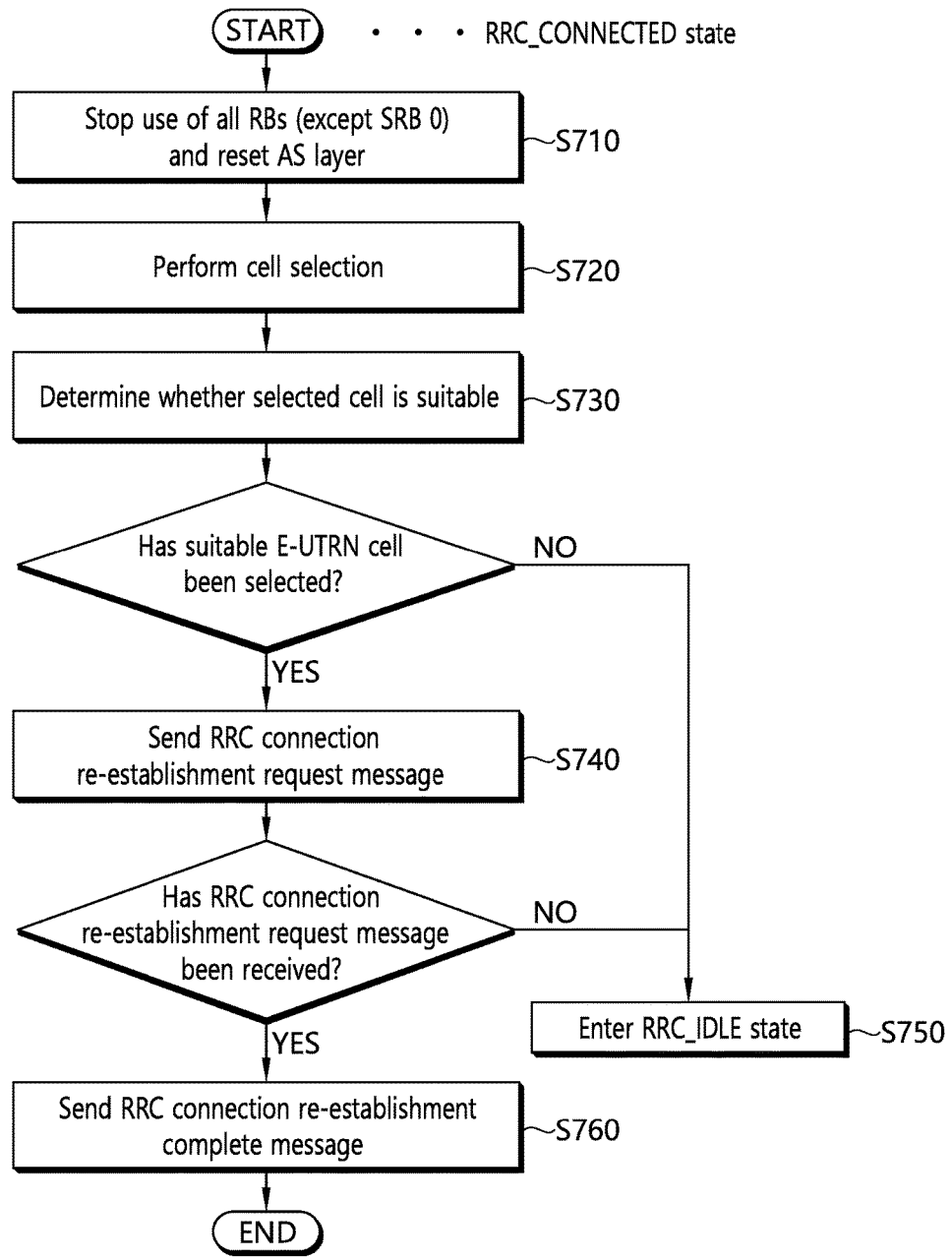
FIG. 7 is a diagram illustrating an RRC connection re-establishment procedure.

FIG. 7 is a diagram illustrating an RRC connection re-establishment procedure.

Referring to FIG. 7, UE stops using all the radio bearers that have been configured other than a Signaling Radio Bearer (SRB) #0, and initializes a variety of kinds of sublayers of an Access Stratum (AS) (S710). Furthermore, the UE configures each sublayer and the PHY layer as a default configuration. In this procedure, the UE maintains the RRC connection state.

The UE performs a cell selection procedure for performing an RRC connection reconfiguration procedure (S720). The cell selection procedure of the RRC connection re-establishment procedure may be performed in the same manner as the cell selection procedure that is performed by the UE in the RRC idle state, although the UE maintains the RRC connection state.

After performing the cell selection procedure, the UE determines whether or not a corresponding cell is a suitable cell by checking the system information of the corresponding cell (S730). If the selected cell is determined to be a suitable E-UTRAN cell, the UE sends an RRC connection re-establishment request message to the corresponding cell (S740).

Meanwhile, if the selected cell is determined to be a cell that uses RAT different from that of the E-UTRAN through the cell selection procedure for performing the RRC connection re-establishment procedure, the UE stops the RRC connection re-establishment procedure and enters the RRC idle state (S750).

The UE may be implemented to finish checking whether the selected cell is a suitable cell through the cell selection procedure and the reception of the system information of the selected cell. To this end, the UE may drive a timer when the RRC connection re-establishment procedure is started. The timer may be stopped if it is determined that the UE has selected a suitable cell. If the timer expires, the UE may consider that the RRC connection re-establishment procedure has failed, and may enter the RRC idle state. Such a timer is hereinafter called an RLF timer. In LTE spec TS 36.331, a timer named "T311" may be used as an RLF timer. The UE may obtain the set value of the timer from the system information of the serving cell.

If an RRC connection re-establishment request message is received from the UE and the request is accepted, a cell sends an RRC connection re-establishment message to the UE.

The UE that has received the RRC connection re-establishment message from the cell reconfigures a PDCP sublayer and an RLC sublayer with an SRB1. Furthermore, the UE calculates various key values related to security setting, and reconfigures a PDCP sublayer responsible for security as the newly calculated security key values. Accordingly, the SRB1 between the UE and the cell is open, and the UE and the cell may exchange RRC control messages. The UE completes the restart of the SRB1, and sends an RRC connection re-establishment complete message indicative of that the RRC connection re-establishment procedure has been completed to the cell (S760).

In contrast, if the RRC connection re-establishment request message is received from the UE and the request is not accepted, the cell sends an RRC connection re-establishment reject message to the UE.

If the RRC connection re-establishment procedure is successfully performed, the cell and the UE perform an RRC connection reconfiguration procedure. Accordingly, the UE recovers the state prior to the execution of the RRC connection re-establishment procedure, and the continuity of service is guaranteed to the upmost.

Figure 8:
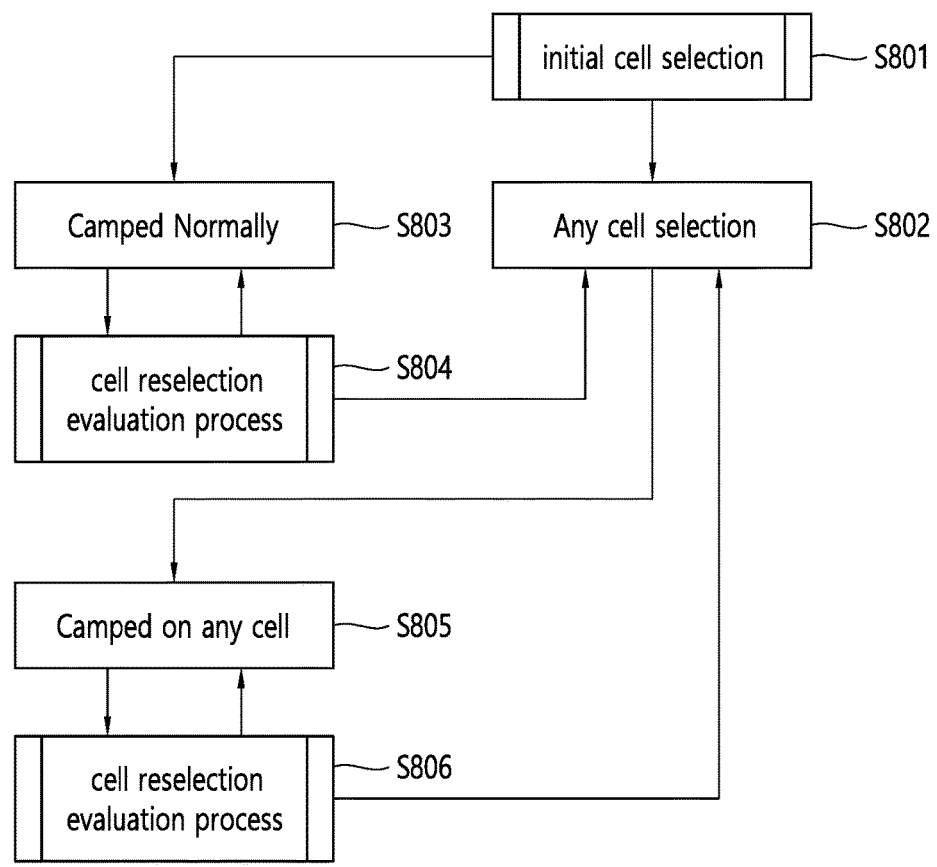
FIG. 8 illustrates sub states where the terminal may have in an RRC_IDLE state and a sub state transition process.

FIG. 8 illustrates sub states where the terminal may have in an RRC_IDLE state and a sub state transition process.

Referring to FIG. 8, a terminal performs an initial cell selection process (S801). The initial cell selection process may be performed when there is no stored cell information with respect to the PLMN or a suitable cell is not found.

If the suitable cell is not found in the initial cell selection process, the terminal transitions to an any cell selection state (S802). The optional cell selection state represents a state which does not camp on in both of a suitable cell and an acceptable cell. The optional cell selection state is a state attempted by the terminal in order to find an acceptable cell of an optional PLMN which may camp on. When the terminal finds no cells which may camp on, the terminal is continuously maintained in an optional cell selection state until the acceptable cell is found.

If the suitable cell is found in the initial cell selection process, the state transits to a normal camp state (S803). The normal camp state represents a state which camps on the normal cell. A paging channel is selected according to information given through system information to motor, and an evaluation process for cell reselection may be performed.

In the normal camp state (S803), if a cell reselection evaluation process (S804) is caused, the cell reselection evaluation process (S804) is performed. If a suitable cell is found in the cell reselection evaluation process (S804), the terminal again transits to the normal camp state (S803).

If an acceptable cell is found in the any cell selection state (S802), the terminal transits to an any cell camped state (S805). The any cell camped state (S805) represents a state of camping on an acceptable cell.

In the any cell camped state (S805), the terminal may select a paging channel according to information given through system information to monitor, and may perform a cell reselection evaluation process (S806). If the acceptable cell is not found in the cell reselection evaluation process (S806), the terminal transits the any cell selection state (S802).

Hereinafter, a D2D operation will be described. In the 3GPP LTE-A, a service related to the D2D operation refers to Proximity based Services (ProSe). Hereinafter, the ProSe is an equivalent concept with the D2D operation and the ProSe may be compatibly used with the D2D operation. The ProSe is now described.

The ProSe includes ProSe direct communication and ProSe direct discovery. The ProSe direct communication presents communication performed by two or more adjacent terminals. The terminals may perform communication using a protocol of a user plane. A ProSe-enabled UE means a UE for supporting a process related to requirements of the ProSe. Unless otherwise defined, the ProSe-enabled UE includes both of a public safety UE and a non-public safety UE. The public safety UE represents a UE for supporting both of a public safety specified function and the ProSe process. The non-public safety UE is a terminal which supports the ProSe process but does not support the public safety specified function.

The ProSe direct discovery is a process where the ProSe-enabled UE discovers another ProSe-enabled UE. In this case, only ability of the two ProSe-enabled UEs is used. An EPC-level ProSe discovery signifies a process where an EPC determines whether 2 ProSe enable terminals are closed to each other, and reports the close state thereof the two ProSe enabled terminals.

Hereinafter, the ProSe direct communication may refer to D2D communication, and the ProSe direct discovery may refer to D2D discovery.

Figure 9:
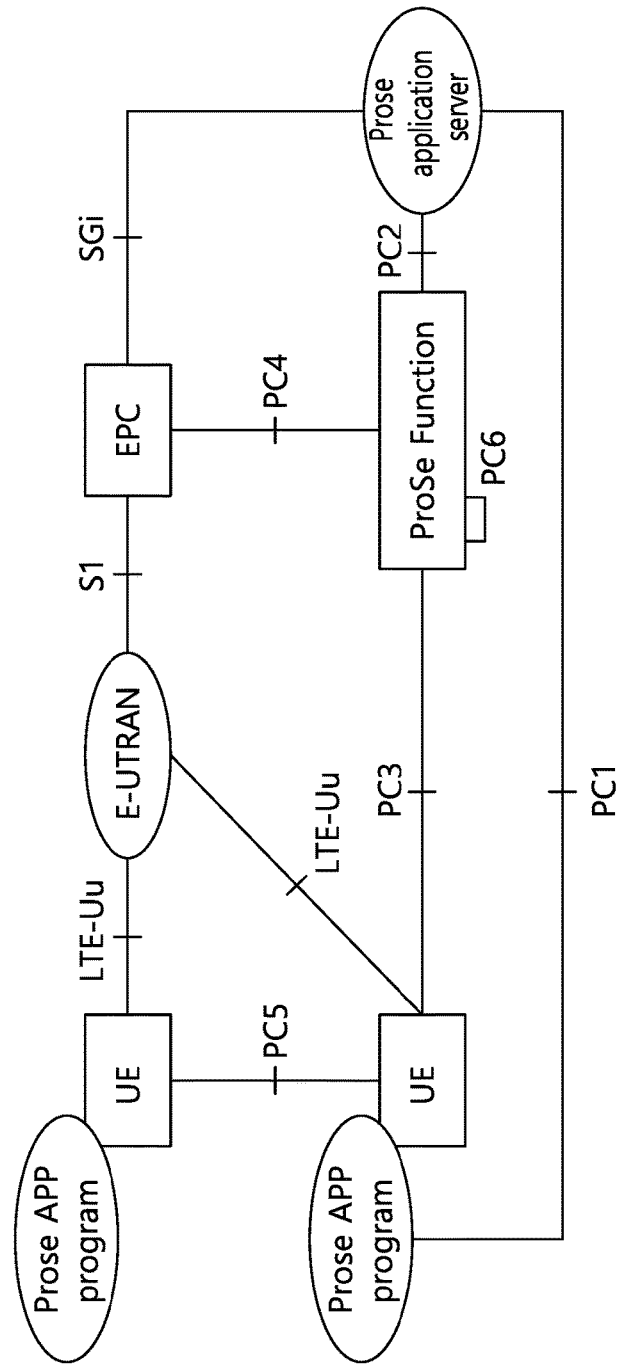
FIG. 9 illustrates a reference structure for a ProSe.

FIG. 9 illustrates a reference structure for a ProSe.

Referring to FIG. 9, the reference structure for a ProSe includes a plurality of terminals having E-UTRAN, EPC, and ProSe application program, a ProSe application (APP) server, and a ProSe function.

An EPC is a representative example of the E-UTRAN. The EPC may include an MME, an S-GW, a P-GW, a policy and charging rules function (PCRF), and a home subscriber server (HSS).

The ProSe application server is a user of ProSe in order to make an application function. The ProSe application server may communicate with an application program in the terminal. The application program in the terminal may use a ProSe ability to make an application function.

The ProSe function may include at least one of following functions but is not limited thereto.

Interworking via a reference point towards the 3rd party applications

Authorization and configuration of the UE for discovery and direct communication)

Enable the function of the EPC level ProSe discovery

ProSe related new subscriber data and handling of data storage, and also handling of ProSe identities Security related function Provide control towards the EPC for policy related function Provide function for charging (via or outside of EPC, e.g., offline charging))

Hereinafter, a reference point and a reference interface will be described in a reference structure for the ProSe.

PC1: a reference point between a ProSe application program in the terminal and a ProSe application program in a ProSe application server. The PC1 is used to define signaling requirements in an application level.

PC2: is a reference point between the ProSe application server and a ProSe function. The PC2 is used to define an interaction between the ProSe application server and a ProSe function. An application data update of a ProSe database of the ProSe function may be an example of the interaction.

PC3: is a reference point between the terminal and the ProSe function. The PC3 is used to define an interaction between the terminal and the ProSe function. Configuration for ProSe discovery and communication may be an example of the interaction.

PC4: is a reference point between an EPC and the ProSe function. The PC4 is used to define an interaction between the EPC and the ProSe function. The interaction lay illustrate when a path for 1:1 communication or a ProSe service for real time session management or mobility management are authorized.

PC5: is a reference point to use control/user plane for discovery, communication, and relay between terminals, and 1:1 communication.

PC6: is a reference point to use a function such as ProSe discovery between users included in different PLMNs.

SGi: may be used for application data and application level control information exchange.

<ProSe Direct Communication (D2D Communication)>.

The ProSe direct communication is a communication mode where two public safety terminals may perform direct communication through a PC 5 interface. The communication mode may be supported in both of a case of receiving a service in coverage of E-UTRAN or a case of separating the coverage of E-UTRAN.

Figure 10:
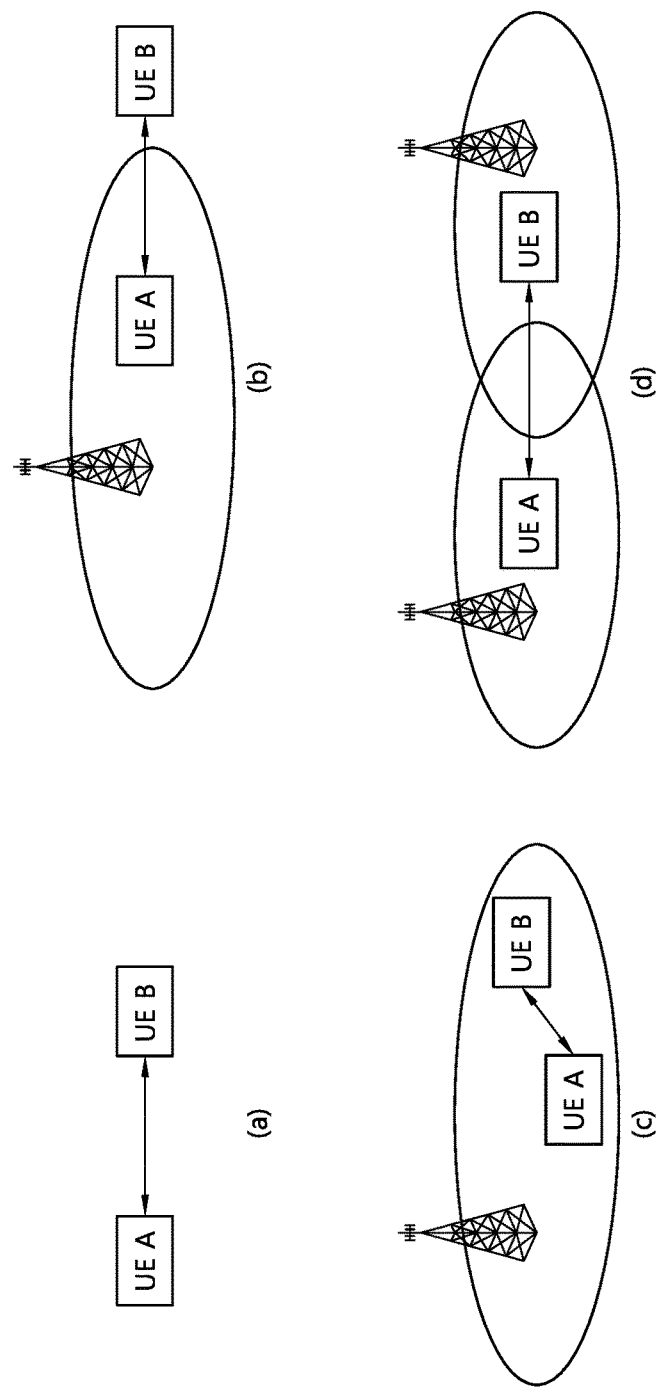
FIG. 10 illustrates arrangement examples of terminals performing ProSe direct communication and cell coverage.

FIG. 10 illustrates arrangement examples of terminals performing ProSe direct communication and cell coverage.

Referring to FIG. 10(a), UEs A and B may be located outside of the cell coverage. Referring to FIG. 10(b), the UE A may be located in the cell coverage and the UE B may be located outside of the cell coverage. Referring to FIG. 10(c), both of UEs A and B may be located in the cell coverage. Referring to FIG. 10(d), the UE A may be located in coverage of a first cell and the UE B may be in coverage of a second cell.

As described above, the ProSe direct communication may be performed between terminals which are provided at various positions.

Meanwhile, following IDs may be used in the ProSe direct communication.

Source layer-2 ID: The source layer-2 ID identifies a sender of a packet in a PC 5 interface.

Purpose layer-2 ID: The purpose layer-2 ID identifies a target of a packet in a PC 5 interface.

SA L1 ID: The SA L1 ID represents an in an ID in a scheduling assignment (SA) in the PC 5 interface.

Figure 11:
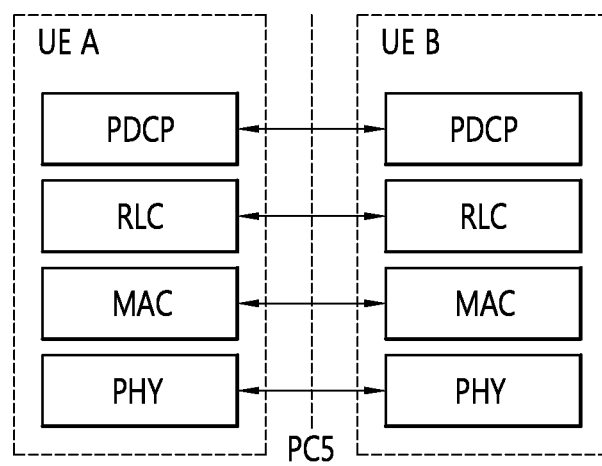
FIG. 11 illustrates a user plane protocol stack for the ProSe direct communication.

FIG. 11 illustrates a user plane protocol stack for the ProSe direct communication.

Referring to FIG. 11, the PC 5 interface includes a PDCH layer, a RLC layer, a MAC layer, and a PHY layer.

There may not be HARQ feedback in the ProSe direct communication. An MAC header may include the source layer-2 ID and the purpose layer-2 ID.

<Radio Resource Assignment for ProSe Direct Communication>.

A ProSe enable terminal may use following two modes with respect to resource assignments for the ProSe direct communication.

1. Mode 1

The mode 2 is a mode for receiving scheduling a resource for the ProSe direct communication from a base station. The terminal should be in a RRC_CONNECTED state according to the mode 1 in order to transmit data. The terminal requests a transmission resource to the base station, and the base station schedules a resource for scheduling assignment and data transmission. The terminal may transmit a scheduling request to the base station and may transmit a Buffer Status Report (ProSe BSR). The base station has data which the terminal will perform the ProSe direct communication and determines whether a resource for transmitting the data is required.

2. Mode 2

The mode 2 is a mode for selecting a direct resource. The terminal directly selects a resource for the ProSe direct communication from a resource pool. The resource pool may be configured by a network or may be previously determined.

Meanwhile, when the terminal includes a serving cell, that is, when the terminal is in an RRC_CONNECTED state with the base station or is located in a specific cell in an RRC_IDLE state, the terminal is regarded to be in coverage of the base station.

If the terminal is located outside of the coverage, only the mode 2 is applicable. If the terminal is located in the coverage, the mode 1 or the mode 2 may be used according to setting of the base station.

If there are no exceptional conditions, only when the base station is configured, the terminal may change a mode from the mode 1 to the mode 2 or from the mode 2 to the mode 1.

<ProSe Direct Discovery (D2D Discovery)>

The ProSe direct discovery represents a process used to discover when the ProSe enabled terminal discovers other neighboring ProSe enabled terminal and refers to D2D direction discovery or D2D discovery. In this case, an E-UTRA wireless signal through the PC 4 interface may be used. Hereinafter, information used for the ProSe direct discovery refers to discovery information.

Figure 12:
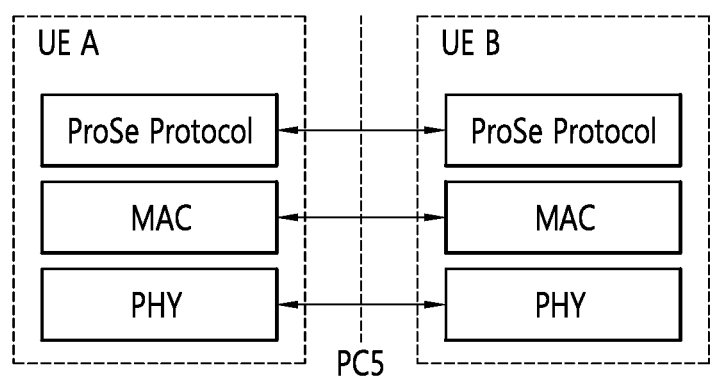
FIG. 12 illustrates a PC 5 interface for D2D discovery.

FIG. 12 illustrates a PC 5 interface for D2D discovery.

Referring to FIG. 12, the PC 5 interface includes an MAC layer, a PHY layer, and a ProSe Protocol layer being an upper layer. Permission for announcement and monitoring of discovery information is handled in the upper layer ProSe Protocol. Contents of discovery information are transparent to an access stratum (AS). The ProSe Protocol allows only valid discovery information to be transferred to the AS for announcement.

An MAC layer receives discovery information from the upper layer ProSe Protocol. An IP layer is not used for transmitting the discovery information. The MAC layer determines a resource used in order to announce the discovery information received from the upper layer. The MAC layer makes and sends a protocol data unit (MAC PDU) to a physical layer. An MAC header is not added.

There are two types of resource assignments for announcing the discovery information.

1. Type 1

The type 1 is a method assigned so that resources for announcing the discovery information are not terminal-specific and the base station provides resource pool configuration for announcing the discovery information to the terminals. The configuration may be included in a system information block (SIB) to be signaled in a broadcast scheme. Alternatively, the configuration may be included in a terminal specific RRC message to be provided. Alternatively, the configuration may be broadcast-signaled or terminal-specific signaled of a different layer from the RRC message.

The terminal selects a resource from an indicated resource pool to announce discovery information using the selected resource. The terminal may announce discovery information through a resource optionally selected during each discovery period.

2. Type 2

The type 2 is a method where resources for announcing the discovery information are terminal-specifically assigned. A terminal in a RRC_CONNECTED state may request a resource for announcing a discovery signal to the base station through a RRC signal. The base station may assign a resource for announcing a discovery signal as an RRC signal. A resource for monitoring the discovery signal in a configured resource pool may be assigned in terminals.

With respect to a terminal in an RRC_IDLE state, a base station may report a type 1 resource pool for announcing the discovery signal as an SIB. Terminals where ProSe direct discovery is allowed use a type 1 resource pool for announcing the discovery information in the RRC_IDLE state. Alternatively, the base station 2) reports that the base station supports the ProSe direct discovery through the SIB but may not provide the resource for announcing the discovery information. In this case, the terminal should enter the RRC_CONNECTED state for announcing the discovery information.

With respect to a terminal in an RRC_CONNECTED state, the base station may configure whether to use a type 1 resource pool or a type 2 resource pool for announcing the discovery information through a RRC signal.

Hereinafter, the present invention will be described in detail.

The wireless device may intend to perform frequency prioritization to obtain the service desired by the wireless device on a certain frequency. That is, the wireless device may camp on the frequency for the PLMN that supports the service desired by the wireless device. For example, the wireless device may prioritizes a frequency used to provide a ProSe service to obtain the ProSe service (e.g., Prose transmission).

In the situation as described above (i.e., the situation in which the frequency use d to provide Prose service is prioritized), the specific wireless device may intend to receive both the Prose service and a cellular service in a specific cell of a specific frequency. In this connection, if the specific wireless device is allowed to perform the Prose operation in the cell selected for the ProSe service, and the wireless device is not allowed to camp on the selected cell for cellular operation, the frequency prioritization (that is, prioritization of the frequency used to provide the ProSe service) may prevent the wireless device from receiving the cellular service.

For example, it may be assumed that the wireless device is allowed to perform ProSe operation on a frequency associated with a first PLMN, and a frequency associate d with a second PLMN; the wireless device is allowed to perform cellular operation on a frequency associated with the second PLMN and on a frequency associated with a third PLMN; a frequency priority is set such that the frequency associated with the first PLMN, the frequency associated with the second PLMN, and the frequency associated with the third PLMN are prioritized in this order (that is, the value related to the frequency priority associated with the first PLMN>the value associated with the frequency priority associated with the second PLMN>the value associated with the frequency priority associated with the third PLMN). In this connection, when the wireless device selects the frequency related to the first PLMN based on the frequency priority only, the wireless device may receive the ProSe service via the selected cell corresponding to the frequency associated with the first PLMN, but will not receive the cellular service via the selected cell. In this connection, although the wireless device wants to receive both ProSe and cellular services, the device selects the frequency related to the first PLMN based on the frequency priority, and transmits/receives a radio signal via the cell corresponding to the selected frequency. In this case, the wireless device may only receive the ProSe service via the selected cell, but may not receive the cellular service.

In response to this, in order to solve the above-described problem, a method of determining a frequency priority in consideration of the situation in which the wireless device desires to receive both the ProSe service and the cellular service is proposed in accordance with to the present invention.

Hereinafter, for convenience of description, ProSe service and D2D service are used interchangeably. In the following, D2D transmission is also applicable to V2X. In this connection, in V2X (Vehicle-to-Infra/Vehicle/Nomadic), mobility is added to the D2D technology, and the driving vehicle constantly communicates with the road infrastructure or other vehicles, while exchanging and sharing useful information such as traffic conditions with other vehicles. The V2X networking may be divided into three categories: that is, Vehicle-to-Infrastructure (V2I) communication, Vehicle-to-Vehicle (V2V) communication, and Vehicle-to-Nomadic device communication. With regard to the charging of electric vehicles that are emerging in recent years, Vehicle-to-Grid (V2G) communication may be added as another category of communication.

Hereinafter, the present invention will be described in detail with reference to the drawings.

Figure 13:
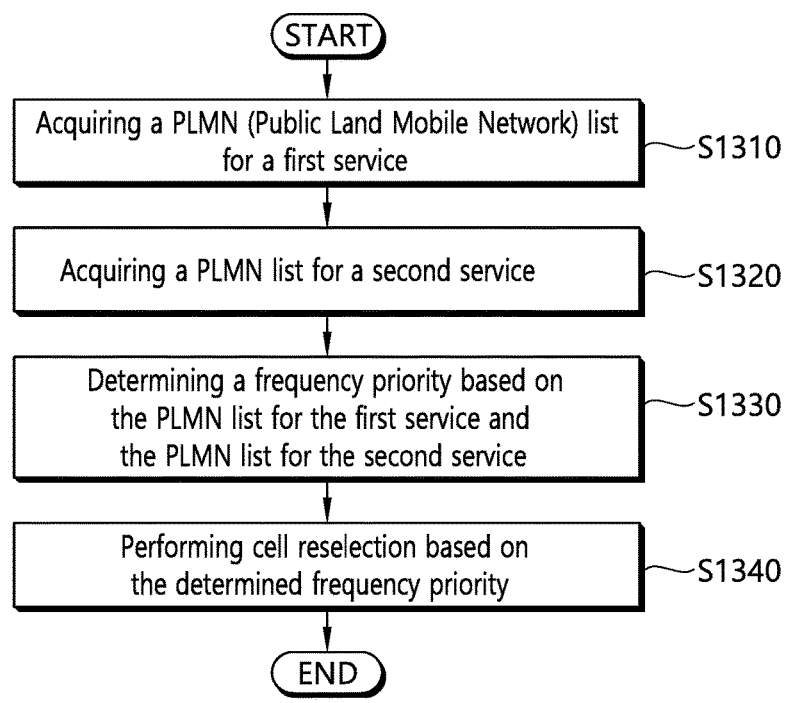
FIG. 13 is a flowchart of a method for determining frequency priority according to an embodiment of the present invention.

FIG. 13 is a flowchart of a method for determining frequency priority according to an embodiment of the present invention.

Referring to FIG. 13, in the D2D operation, the wireless device may receive a PLMN list related to a first service (S1310). In this connection, the PLMN list for the first service received by the wireless device may refer to a list (e.g., EPLMN list) of PLMNs registered for the first service. As described above, the PLMN registration may mean that the PLMN selected by the wireless device is registered by a network. In this connection, the PLMN list for the first service may be supplied from the network, and in addition, the PLMN list for the first service may be pre-set for the wireless device. In this connection, for convenience of description, the expression that the PLMN list for the first service is received by the device may be equivalent to expression that the PLMN list for the first service is acquired by the device.

Further, referring to FIG. 13, in the D2D operation, the wireless device may receive a PLMN list related to a second service (S1320). In this connection, the PLMN list for the second service received by the wireless device may refer to a list (e.g., EPLMN list) of PLMNs registered for the second service. In this connection, the PLMN list for the second service may be supplied from the network, and in addition, the PLMN list for the second service may be pre-set for the wireless device. In this connection, for convenience of description, the expression that the PLMN list for the second service is receive d by the device may be equivalent to expression that the PLMN list for the second service is acquired by the device.

In this connection, for convenience of description, it is described herein that the wireless device receives the PLMN list for the first service and thereafter receives the PLMN list for the second service. However, this is merely for convenience of description, and, rather, the wireless device may receive the list of PLMNs for the second service and then receive the list of PLMNs for the first service. This is not excluded from the scope of the present invention.

The wireless device determines the frequency priority based on the PLMN list for the first service and the PLMN list for the second service (S1330). That is, the frequency for the PLMN that is commonly included in the PLMN lists for the first and second services may be determined as a frequency having the highest priority.

More specifically, in the PLMN list for the first service, there are PLMNs providing the first service. In this connection, each PLMN is associated with each frequency. For example, the PLMN list for the first service may include a first PLMN and a second PLMN.

Furthermore, in the PLMN list for the second service, there are PLMNs that provide the second service. Each PLMN is associated with each frequency. For example, the PLMN list for the second service may include the second PLMN and a third PLMN.

In the above example, the first PLMN is associated with a first frequency, the second PLMN is associated with a second frequency, and the third PLMN may be associated with a third frequency.

In this connection, when the wireless device wants to receive both the first service and second service, the wireless device may prioritize the frequency associated with the PLMN providing both the first service and second service. That is, the wireless device may determine the frequency associated with the PLMN providing both the first service and the second service as the highest priority frequency.

For example, followings may be assumed: the PLMN providing first service includes the first PLMN and the second PLMN; the first service is provided at the first frequency, which is a frequency associated with the first PLMN, and the second frequency, which is a frequency associated with the second PLMN; the PLMN providing the second service includes the second PLMN and the third PLMN; and the second service is provided at the second frequency, which is the frequency associated with the second PLMN, and at the third frequency, which is the frequency associated with the third PLMN. In this case, the wireless device may prioritize the second frequency used to provide both the first service and the second service.

The above-described frequency prioritization may be performed separately from legacy frequency reselection prioritization. For example, although the cell reselection priority of the first frequency is higher than the cell reselection priority of the second frequency, and the cell reselection priority of the second frequency is higher than the cell reselection priority of the third frequency, the wireless device may prioritize the second frequency, which is the frequency used to provide both the first service and the second service, when the wireless device desires to receive both the first service and the second service. That is, the wireless device may determine the second frequency as a frequency having the highest cell reselection priority.

Thereafter, the wireless device may perform wireless signal transmission/reception based on the frequency corresponding to the selected priority (S1340). That is, the wireless device may receive the first service or the second service based on a suitable cell us ing the frequency selected by the wireless device. In other words, the wireless device per forms cell reselection based on the selected frequency priority, and receives the first service or the second service via the reselected cell.

In this connection, the above frequency prioritization procedure may be performed in the RRC idle state.

Hereinafter, a process of prioritizing a frequency used to provide both ProSe service and cellular service by the wireless device will be described in more detail with reference to the drawings.

Figure 14:
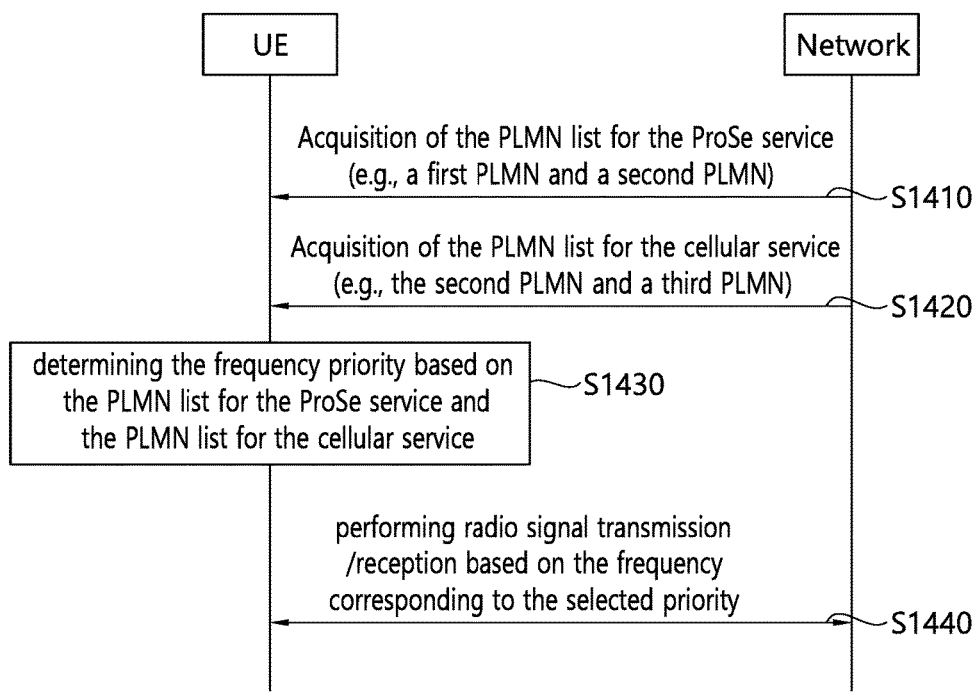
FIG. 14 is a flowchart of a method for determining frequency priority according to another embodiment of the present invention.

FIG. 14 is a flowchart of a method for determining frequency priority according to another embodiment of the present invention.

Referring to FIG. 14, in the D2D operation, the wireless device may receive the PLMN list for the ProSe service (S1410). In this connection, the PLMN list for the ProSe service as received by the wireless device may be a list (e.g., an EPLMN list) of PLMNs registered for the ProSe service. The PLMN registration may mean that the PLMN selected by the wireless device is registered by the network, as described above.

Thereafter, in the D2D operation, the wireless device may receive the PLMN list for the cellular service (S1420). In this connection, the PLMN list for the cellular service as received by the wireless device may be a list (e.g., an EPLMN list) of PLMNs registered for the cellular service.

In this connection, for convenience of description, it is described herein that the wireless device receives the PLMN list for the ProSe service and thereafter receives the PLMN list for the cellular service. However, this is merely for convenience of description, and, rather, the wireless device may receive the list of PLMNs for the cellular service and then receive the list of PLMNs for the ProSe service. This is not excluded from the scope of the present invention.

The wireless device determines the frequency priority based on the PLMN list for the ProSe service and the PLMN list for the cellular service (S1430).

More specifically, in the PLMN list for the ProSe service, there are PLMNs providing the ProSe service. In this connection, each PLMN is associated with each frequency. For example, the PLMN list for the ProSe service may include a first PLMN and a second PLMN.

Furthermore, in the PLMN list for the cellular service, there are PLMNs that provide the cellular service. Each PLMN is associated with each frequency. For example, the PLMN list for the cellular service may include the second PLMN and a third PLMN.

In the above example, the first PLMN is associated with a first frequency, the second PLMN is associated with a second frequency, and the third PLMN may be associated with a third frequency.

In this connection, when the wireless device wants to receive both the ProSe service and cellular service, the wireless device may prioritize the frequency associated with the PLMN providing both the ProSe service and cellular service. That is, the wireless device may determine the frequency associated with the PLMN providing both the ProSe service and the cellular service as the highest priority frequency.

For example, followings may be assumed: the PLMN providing ProSe service includes the first PLMN and the second PLMN; the ProSe service is provided at the first frequency, which is a frequency associated with the first PLMN, and the second frequency, which is a frequency associated with the second PLMN; the PLMN providing the cellular service includes the second PLMN and the third PLMN; and the cellular service is provided at the second frequency, which is the frequency associated with the second PLMN, and at the third frequency, which is the frequency associated with the third PLMN. In this case, the wireless device may prioritize the second frequency used to provide both of the ProSe service and the cellular service.

The above-described frequency prioritization may be performed separately from legacy frequency reselection prioritization. For example, although the cell reselection priority of the first frequency is higher than the cell reselection priority of the second frequency, and the cell reselection priority of the second frequency is higher than the cell reselection priority of the third frequency, the wireless device may prioritize the second frequency, which is the frequency used to provide both the ProSe service and the cellular service, when the wireless device desires to receive both the ProSe service and the cellular service. That is, the wireless device may determine the second frequency as a frequency having the highest cell reselection priority.

1) A specific example of an embodiment of the present invention is as follows: when the wireless device is interested in performing D2D transmission via a cell selected for D2D transmission on a specific frequency, and the wireless device wishes to obtain a cellular service via the selected cell of the frequency, the wireless device may consider the specific frequency as a frequency having the highest frequency priority. Furthermore, if the wireless device fails to acquire the cellular service via the selected cell of the specific frequency, the wireless device may not determine the specific frequency as the highest priority frequency for D2D transmission.

According to the above example, it is allowed for the wireless device to consider the second frequency as having the highest frequency priority.

According to the example described above, it is not allowed for the wireless device to consider the first frequency as having the highest frequency priority. That is, although the first frequency may in principle have the highest frequency priority, the wireless device does not consider the first frequency as a frequency having the highest frequency priority because the wireless device cannot receive the cellular service at the first frequency.

1) A optional example of an embodiment of the present invention is as follows: when the wireless device is interested in performing D2D transmission via a cell selected for D2D transmission on a specific frequency, and the wireless device wishes to obtain a cellular service via a cell using a prioritized frequency (that is, highest priority frequency), the wireless device may consider the specific frequency as a frequency having the highest frequency priority. Furthermore, if the wireless device fails to acquire the cellular service via the selected cell of the specific frequency, as used to determine whether frequency prioritization for D2D transmission is allowed, the wireless device may not determine the specific frequency as the highest priority frequency for D2D transmission.

According to the above optional example, it is allowed for the wireless device to consider the second frequency as having the highest frequency priority.

According to the example described optional above, it is not allowed for the wireless device to consider the first frequency as having the highest frequency priority. That is, although the first frequency may in principle have the highest frequency priority, the wireless device does not consider the first frequency as a frequency having the highest frequency priority because the wireless device cannot receive the cellular service at the first frequency.

Thereafter, the wireless device may perform radio signal transmission/reception based on the frequency corresponding to the selected priority (S1440). That is, the wireless device may receive the ProSe service or the cellular service via a suitable cell using the frequency selected by the wireless device.

More specifically, when it is possible that the wireless device receives a normal service from a specific cell (that is, a cell selected by the wireless device) using the frequency described above, the wireless device may consider that the cellular service may b e acquired on the specific cell. The specific cell may be a suitable cell. That is, when the wireless device is able to receive the entire cellular service from the specific cell on the frequency (e.g., the second frequency) described above, the specific cell may be a suit able cell for the cellular service. In this connection, the specific details of the suitable cell are as described above.

Optionally, when the wireless device is able to acquire a normal service or at least an emergency call service from the specific cell on the above-mentioned frequency, the wireless device may consider that the cellular service may be obtained on the cell. In this connection, the specific cell may be a suitable cell or an acceptable cell. That is, when the wireless device can receive the entire cellular service or only a portion of the cellular service via the specific cell using the frequency, the cell may be a suitable cell or an acceptable cell for the cellular service. In this connection, the details of the suitable cell and acceptable cell are as described above.

The D2D transmission described above may refer to a ProSe direct discovery announcement, or the D2D transmission may also refer to a ProSe direct communication transmission.

The embodiments of the present invention described above may also be applied a s follows.

1. General

The first question is as follows: In which RRC state (RRC states may include RRC connected state and RRC idle state, as described above), discovery on non-serving cell and secondary cell is supported. It may be preferable that, in all RRC states, discovery on non-serving cell and secondary cell to allow for flexible network configuration and continuous ProSe operation of the wireless device.

Proposal 1: RAN may support announcement of ProSe direct discovery on non-serving cell and/or secondary cell at the RRC idle state and RRC connected state.

The list of PLMNs in which ProSe direct discovery is allowed may be different from the list of PLMNs in which cellular operation is allowed. When the Applicant discusses an announcement on a non-Primary cell (non-PCell), it may be always guessed or guaranteed that the announcement only occurs on the cell of the PLMN in which announcement of ProSe direct discovery is authorized.

Proposal 2: Announcement of ProSe direct discovery on non-serving cell and/or secondary cell may be restricted to cells associated with PLMN(s) in which ProSe direct discovery announcement is granted.

Reception of ProSe direct discovery on non-serving cells of other frequencies is not restricted in 3GPP Rel-12.

2. Enhancement for RRC Idle Mode

The following is assumed: In the RRC idle state, the wireless device camps on cell 1 of current frequency 1, and the wireless device is interested in discovery announcement on cell 2 of frequency 2.

Approach 1: the device changes a primary cell using a modified inter-frequency cell reselection method. At this time, the wireless device performs discovery announcement on the new primary cell.

Approach 2: The wireless device performs discovery announcement on the inter-frequency cell.

The approach 1 is based on Rel-12 where the discovery announcement is only allowed on the primary cell. In order to change the primary cell of the wireless device into an inter-frequency cell supporting the discovery announcement, the wireless device may need to be allowed to perform frequency prioritization. The approach (that is, approach 1) described above is simple and minimizes the required extensions (e.g., allowing frequency prioritization to be sufficient). On the other hand, the side effect of this approach (that is, approach 1) is that when there are multiple frequencies supporting the discovery announcement, the selection of frequency from frequencies by the network up to the execution of the wireless device may not allow the wireless device to stay at the frequency for the discovery announcement (that is, the camping frequency as described above is almost random among the above frequencies). Another drawback is that the approach (that is, approach 1) described above may not have any benefit in terms of wireless device capacity in performing cellular and discovery operations at the same time.

The approach 2 is based on the elimination of the limitations of Rel-12 as described above (that is, the approach 2 is free from the constraints of Rel-12). With this removal of the constraints, the wireless device may perform discovery announcement on a non-primary cell in the idle period of the current primary cell, without additional enhancement. When, by a wireless device that cannot perform discovery and cellular operations simultaneously, the discovery announcement on the non-primary cell is performed without any enhancement, it may be predicted that the above-mentioned performance (that is, announcement of discovery is performed without any special enhancement) has the quality of performance of the discovery announcement worse than that of the discovery announcement on the primary-cell. This is due to followings: 1) The current primary cell may not know what cell in which the wireless device is interested in the discovery announcement (that is, the current primary cell may not know what frequency is the frequency at which the wireless device is interested to perform discovery announcement); 2) The current primary cell may not know the exact time of discovery opportunity on the cell of interest (that is, interest frequency) in which that the wireless device is interested in performing the discovery announcement. Because of defections described as above, it is impossible for the wireless device to take such actions as cellular scheduling constraint, for the sake of discovery announcement on the non-primary cell, unless some additional enhancement is introduced.

Based on the above analysis, and with taking into account that the overall management of the idle mode wireless device is important, the present inventors consider that the approach 2 should be a reference for enhancement for the RRC idle mode, and the approach 2 does not affect the camping operation of the wireless device in the idle mode. It is noted that the transmission of direct communication on the secondary cell or non-serving cell is already supported by Rel-12. As suggested in the approach 2 above, it is desirable to be able to control the wireless device operation of the direct communication and discovery at any time.

Proposal 3: the approach 2 is appropriate as a reference. That is, the discovery announcement on the non-primary cell is allowed.

In addition to the approach 2 above, the approach 1 has a definite advantage, especially when cellular operation and discovery operation are simultaneously impossible. If reselection to another cell (e.g., low priority cell) is allowed, the wireless device may a void frequency RF readjustment, which may require discovery announcement on the inter-frequency.

Proposal 4: The approach 1 described above may be supported in the enhancement for the RRC idle mode.

In order to support all of the above proposals, it is necessary to discuss the following additional issues:

Configuration of transmission resource pool corresponding to non-primary cell (for approach 2)

frequency prioritization (for approach 1)

<Supply of Transmission Resource Pool Corresponding to Non-Primary Cell>

If there is no assisting information for the announcement on the non-serving cell, the wireless device needs to acquire SIB 19 (system information block 19) from the tar get non-serving cell. Further, the acquisition of SIB 19 requires that the wireless device access the master information block (MIB) prior to SIB 1. In order to avoid the inefficient operation of the wireless device as described above, it may be considered that the serving cell transmits assisting information for assisting the announcement to the wireless device. In this connection, examples of the assisting information may include cp-length, discPeriod, numRetx, num-Repetition, tf-ResourceConfig and txParameters included SL-DiscResourcePool.

Proposal 5: the cell may signal transmission pool parameter corresponding to cell of other frequency via SIB 19.

Transmission resource allocation for non-primary cells may require RSRP-based resource pool selection. Accordingly, the wireless device may need to know the measurement bandwidth according to the resource pool selection based on the RSRP measurement of the corresponding cell. During frequency information reselection, a frequency which the wireless device is interested in using to perform the discovery announcement may be included in the frequency reselection information. The wireless device may know measurement of the bandwidth of the cell from the SIB 15 of the primary cell. However, when the wireless device is interested in performing the discovery announcement at a frequency not listed in frequency reselection information, it is necessary to inform the wireless device of the additional measurement bandwidth. When the supplied resource affects the frequency not listed in the reselection frequency information as discussed herein, the cell needs to signal the measured bandwidth as a portion of the assisting information via SIB 19.

Proposal 6: The cell may signal assisting information for discovery announcement via SIB 19. In this connection, the above assisting information may include measurement bandwidth.

To support the discovery announcement (that is, announcement on inter-frequency) on a non-primary cell, the wireless device first needs to select the cell used for the discovery announcement. It is desirable that the wireless device follows the principles used to perform additional intra-frequency reselection based on additional measurements and applicable to ProSe direct communications. RSRP based on transmission resource pool selection may also be used in the case of operation for discovery announcement on the non-primary cell. The wireless device may need to perform measurements on the cell described above. According to current measurement requirements, it is unnecessary for the wireless device to measure a cell with a lower priority than the primary cell. In principle, discovery announcement on the non-primary cell may be delayed per a discovery period, without additional measurements beyond the current measurement requirements.

Proposal 7: when the wireless device in RRC idle mode is interested in performing discovery announcement on non-primary cell of inter-frequency, the wireless device performs measurements on the cell (that is, in fact, frequency) without considering the priority of the frequency of the wireless device.

Proposal 8: Additional measurements defined for ProSe direct communications may be applied to the measurement of the frequency of non-primary cell in which the wireless device in RRC idle mode is interested to perform the ProSe direct discovery.

Proposal 9: Upon receiving the assisting information corresponding to the resource pool parameter and the non-primary cell, the wireless device may use other information and resource pools for announcement using the frequency, without reading MIB, SIB 1, and SIB 19 of the cell.

<Frequency Prioritization>

Proposal 10: The wireless device may be allowed to perform frequency prioritization for the discovery announcement.

Proposal 11: The wireless device may be allowed to perform frequency prioritization only if the wireless device is allowed to camp on a cell of the prioritized frequency.

Proposal 12: frequency prioritization may only be allowed for a cell associated with the PLMN(s) in which the ProSe direct discovery announcement is approved.

3. Enhancement of RRC Connected Mode

There are three scenarios that may be considered for the discovery announcement in the RRC connected state:
announcement on primary cell
announcement on secondary cell
announcement on non-serving cell (e.g., inter-frequency cell)

In this connection, the first scenario is supported by Rel-12, and the following two scenarios need to be discussed below. The first discussion is whether transmission is allowed on a non-secondary cell while the wireless device is already configured for the secondary cell on carrier frequency. The inventor's view is that it is inappropriate that it is allowed that announcement on a non-secondary cell is performed on a secondary carrier. Otherwise, that is, if the announcement on a non-secondary cell is performed on a secondary carrier, interference will occur with the uplink of the secondary cell.

Proposal 13: Speaking of the discovery announcement on the serving frequency, the wireless device is only allowed to perform announcement on the serving cell (secondary cell or primary cell).

Similar discussion arises about discovery announcement on non-serving frequency. Thus, it should be determined whether the device is allowed to announce discovery on the best-ranked cell on the non-serving frequency. As mentioned, in order to take ProSe direct communication, the wireless device may use the best-ranked cell on the non-serving frequency, for a ProSe direct discovery announcement on the non-serving frequency. This requires the additional requirements to be introduced below.

Proposal 14: When the wireless device in the RRC connected state is interested in performing discovery announcement on a non-serving cell (that is, a cell on the inter-frequency), measurement on the frequency of the cell may be performed although the frequency of the cell is not the measurement target.

Proposal 15: Additional measurements defined for ProSe direct communication may be applied to measurements on the frequency of a non-primary cell in which the wireless device in the RRC connected state is interested in carrying out the announcement of ProSe direct discovery.

Proposal 16: Additional measurements defined for ProSe direct communication may be applied to measurements on the frequency of non-primary cells.

When the wireless device enters the RRC connected state, the wireless device may indicate the interest in receiving, transmitting, or transmitting or receiving of the disco very by transmitting sidelink wireless device information.

The wireless device may be interested in announcing discovery on a specific secondary cell. In this case, for example, the wireless device may indicate a serving cell index, as a portion of a transmission resource request, or the wireless device may indicate a carrier frequency of the serving cell as a portion of a transmission resource request. Assuming that the difference in signaling size is small, the wireless device may preferably perform the general operation for the above two processes.

Proposal 17: The wireless device can indicate, via sidelink wireless device information, the list of carrier frequencies at which the wireless device is interested in performing the discovery announcement. In this connection, the indicated frequency may be the serving frequency and the non-serving frequency.

Proposal 18: The wireless device can indicate, via sidelink wireless device information, the list of carrier frequencies at which the wireless device is interested in performing the discovery announcement.

The restriction for the proposed announcement is as follows: Announcement on the primary cell or secondary cell for the discovery announcement on the serving frequency may also be applied to the triggering of the sidelink wireless device information.

Proposal 19: Subsequent discussion

The wireless device may be interested in announcing discovery on a specific secondary cell. In this case, for example, the wireless device may indicate a serving cell index, as a portion of a transmission resource request, or the wireless device may indicate a carrier frequency of the serving cell as a portion of a transmission resource request. The wireless device may be interested in announcing discovery on a non-serving cell of inter-frequency. In this case, the wireless device may indicate the carrier frequency of the target non-serving cell. Assuming that the difference in signaling size is small, it is desirable for the wireless device to have a common operation for both of the cases.

Proposal 20: The wireless device is capable of indicating, via sidelink wireless de vice information, the list of carrier frequencies at which the wireless device is interested in performing the discovery announcement.

If the base station is aware of transmission of resource pool parameters for a cell of a frequency at which the wireless device is interested in discovery announcement, it is natural for the wireless device to signal the signaled resource pool parameters to other wireless devices that may announce the discovery at different frequencies. This is true when the wireless device is interested in the discovery announcement on the secondary carrier.

Proposal 21: The cell may perform signalling via dedicated signalled transmission resource pool parameters and via assisting information corresponding to a cell of a different frequency.

If the base station does not notice the transmission resource pool parameter for a cell of another frequency at which the wireless device is interested in discovery announcement, the base station may not consider an uplink scheduling of the discovery announcement of a wireless device of interest at another frequency in relation to the corresponding wireless device. Thus, whenever discovery announcement and uplink scheduling overlap each other, the wireless device needs to drop the discovery announcement based on the cellular prioritization principle. This causes a performance degradation of the discovery announcement on the frequency mentioned above.

One solution is for the wireless device to report the transmission resource pool parameter corresponding to the cell of the frequency at which the wireless device is interested in performing the discovery announcement. For example, if the wireless device considers that the serving cell of the wireless device does not know the transmission resource pool of another cell in which the wireless device is interested in performing discovery announcement, the wireless device may provide a report via sidelink wireless device information in a transmission resource request, for example.

Proposal 22: the wireless device may consider introducing, together with timing information, a wireless device reporting mechanism that is configured to report the transmission resource pool parameter corresponding to a cell of a different frequency to the serving cell of the wireless device.

<Capability of Wireless Device>

Currently, the wireless device only reports the band supported for discovery to the base station and does not report information about concurrent operation between D2D operation and cellular operation to the base station. This is acceptable only if the discovery announcement is restricted as in Rel-12. However, if it is intended to support discovery on a secondary carrier or a non-serving carrier, the capability of the wireless device may not be sufficient. For example, the base station may not know whether restricting cellular uplink scheduling is applied for assisting the discovery announcement on other frequencies. When the discussion focuses on discovery transmission, the useful knowledge from the base station side is whether the wireless device simultaneously supports discovery transmission and cellular transmission on a combination of bands of interest.

Proposal 23: Wireless device capability signaling for discovery is enhanced by enabling simultaneous operations of discovery transmission and cellular transmission in each band combination.

Figure 15:
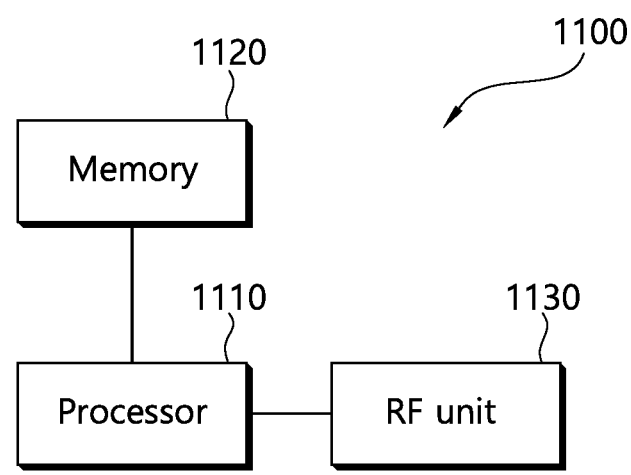
FIG. 15 is a block diagram illustrating a wireless device in which an embodiment of the present invention is implemented.

FIG. 15 is a block diagram illustrating a wireless device in which an embodiment of the present invention is implemented.

Referring to FIG. 15, the wireless device 1100 includes a processor 1110, a memory 1120, and an RF unit (radio frequency unit) 1130. Processor 1110 implements the functionality, processes, and/or methods suggested above. For example, the processor 1110 may receive system information from the relay wireless device via the RF unit 1130. The processor 1110 may then receive a list of PLMNs for the first service. The processor 1110 may then receive a PLMN list for the second service. The processor 1110 may then determine the frequency priority based on the PLMN list for the first service and the PLMN list for the second service. Thereafter, the processor 1110 may perform wireless signal transmission/reception based on the frequency corresponding to the selected priority.

The RF unit 1130 is connected to the processor 1110 to transmit and receive radio signals.

The processor may include an application-specific integrated circuit (ASIC), other chipset, logic circuitry, and/or a data processing device. The memory may include read-only memory (ROM), random access memory (RAM), flash memory, memory cards, storage media, and/or other storage devices. The RF unit may include a baseband circuit for processing the radio signal. When the embodiment is implemented in software, the above-described approaches or proposals may be implemented with modules (processes, functions, and so on) that perform the functions described above. Modules are stored in memory and are executed by the processor. The memory may be internal or external to the processor, and may be connected to the processor by a variety of well-known connection means.

What is claimed is:

1. A method for determining a frequency priority in a wireless communication system, the method performed by a user equipment (UE), which supports device to device (D2D) operation, and comprising: acquiring a first Public Land Mobile Network (PLMN) list for a D2D service and a second PLMN list for a cellular service, wherein the first PLMN list includes a first PLMN and a second PLMN, and wherein the second PLMN list includes the second PLMN and a third PLMN; determining the frequency priority based on the first PLMN list and the second PLMN list; and performing cell reselection based on the determined frequency priority, wherein the UE determines, as a highest priority frequency, a frequency for the second PLMN which is commonly included in the first PLMN list and the second PLMN list, wherein a cell on the frequency for the second PLMN is a suitable cell or an acceptable cell, and wherein the suitable cell is a cell capable of receiving a normal service, and the acceptable cell is a cell capable of acquiring an emergency communication service.

2. The method of claim 1, wherein each of the first PLMN list and the second PLMN list is an Equivalent PLMN (EPLMN) list, wherein the EPLMN list is a list of PLMNs for which location registration has been successfully completed.

3. The method of claim 1, wherein the method further comprises:
receiving the D2D service or the cellular service via a cell on the highest priority frequency.

4. The method of claim 1, wherein the D2D service is a Vehicle-to-Infra/Vehicle/Nomadic (V2X) service.

5. A user equipment (UE), which supports device to device (D2D) operation, comprising: a transmitter and a receiver; and a processor, operably coupled to the transmitter and the receiver, that: acquires a first Public Land Mobile Network (PLMN) list for a D2D service and a second PLMN list for a cellular service, wherein the first PLMN list includes a first PLMN and a second PLMN, and wherein the second PLMN list includes the second PLMN and a third PLMN; determines the frequency priority based on the first PLMN list and the second PLMN list; and performs cell reselection based on the determined frequency priority, wherein the processor determines, as a highest priority frequency, a frequency for the second PLMN which is commonly included in the first PLMN list and the second PLMN list, wherein a cell on the frequency for the second PLMN is a suitable cell or an acceptable cell, and wherein the suitable cell is a cell capable of receiving a normal service, and the acceptable cell is a cell capable of acquiring an emergency communication service.

6. The device of claim 5, wherein each of the first PLMN list and the second PLMN list is an Equivalent PLMN (EPLMN) list, wherein the EPLMN list is a list of PLMNs for which location registration has been successfully completed.

7. The device of claim 5, wherein the processor controls the receiver to receive the D2D service or the cellular service via a cell on the highest priority frequency.

8. The device of claim 5, wherein the D2D service is a Vehicle-to-Infra/Vehicle/Nomadic (V2X) service.

* * * * *